(12) United States Patent
Gupta

(10) Patent No.: US 9,572,000 B2
(45) Date of Patent: Feb. 14, 2017

(54) FACILITATING SOCIAL NETWORKING SERVICE CONNECTIONS VIA AN AD HOC PEER-TO-PEER NETWORK OF MOBILE DEVICES

(71) Applicant: LinkedIn Corporation, Mountain View, CA (US)

(72) Inventor: Akhilesh Gupta, Sunnyvale, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 70 days.

(21) Appl. No.: 14/530,356

(22) Filed: Oct. 31, 2014

(65) Prior Publication Data

US 2016/0095140 A1 Mar. 31, 2016

Related U.S. Application Data

(60) Provisional application No. 62/057,937, filed on Sep. 30, 2014.

(51) Int. Cl.
*G01R 31/08* (2006.01)
*H04W 4/20* (2009.01)
(Continued)

(52) U.S. Cl.
CPC ......... *H04W 4/206* (2013.01); *G06Q 10/1095* (2013.01); *G06Q 50/01* (2013.01);
(Continued)

(58) Field of Classification Search
CPC .... H04W 4/206; H04W 4/023; H04W 76/002; H04W 4/12; G06Q 50/01; G06Q 10/1095; H04L 51/32

See application file for complete search history.

(56) References Cited

U.S. PATENT DOCUMENTS

2003/0050977 A1* 3/2003 Puthenkulam ........ H04W 76/02 709/204
2010/0138481 A1* 6/2010 Behrens .................. H04L 12/58 709/203
(Continued)

FOREIGN PATENT DOCUMENTS

EP 2725761 A1 4/2014
IN 894DEL2015 A 4/2016
(Continued)

OTHER PUBLICATIONS

"International Application Serial No. PCT/US15/22996, International Search Report mailed Jul. 8, 2015", 2 pgs.
(Continued)

*Primary Examiner* — Robert Wilson
(74) *Attorney, Agent, or Firm* — Schwegman Lundberg & Woessner, P.A.

(57) ABSTRACT

A first mobile device may be configured to facilitate context-aware, graph-based interactions. For example, the first mobile device receives a first communication from a second mobile device. The first communication includes a second member identifier of a second member of the social networking service. The second member identifier may be associated with the second mobile device. In response to the receiving of the first communication, the first mobile device may determine, based on the second member identifier, that the second member is one of a plurality of members of the social networking service. The first mobile device may facilitate the establishing of the wireless peer-to-peer connection with the second mobile device based on the determining that that the second member is one of the plurality of members of the social networking service.

17 Claims, 16 Drawing Sheets

(51) Int. Cl.
*H04W 4/02* (2009.01)
*G06Q 50/00* (2012.01)
*G06Q 10/10* (2012.01)
*H04W 76/00* (2009.01)
*H04L 12/58* (2006.01)
*H04W 4/12* (2009.01)

(52) U.S. Cl.
CPC ............. *H04L 51/32* (2013.01); *H04W 4/023* (2013.01); *H04W 4/12* (2013.01); *H04W 76/002* (2013.01)

(56) References Cited

U.S. PATENT DOCUMENTS

| | | | | |
|---|---|---|---|---|
| 2011/0125850 | A1* | 5/2011 | Rahnama | .............. G06Q 10/10 709/205 |
| 2012/0238285 | A1* | 9/2012 | Yariv | ..................... H04W 4/08 455/456.1 |
| 2013/0166654 | A1* | 6/2013 | Hjelm | ................. H04L 67/1046 709/204 |
| 2016/0094963 | A1 | 3/2016 | Gupta | |
| 2016/0095140 | A1* | 3/2016 | Gupta | ................... H04W 4/206 370/252 |

FOREIGN PATENT DOCUMENTS

| | | |
|---|---|---|
| WO | WO-2013169974 A1 | 11/2013 |
| WO | WO-2016053384 A1 | 4/2016 |

OTHER PUBLICATIONS

"International Application Serial No. PCT/US15/22996, Written Opinion mailed Jul. 8, 2015", 9 pgs.

* cited by examiner

FACILITATING SOCIAL NETWORKING SERVICE CONNECTIONS VIA AN AD HOC PEER-TO-PEER NETWORK OF MOBILE DEVICES

CLAIM OF PRIORITY

This application claims the benefit of priority to U.S. Provisional Patent Application No. 62/057,937, filed on Sep. 30, 2014, which is hereby incorporated herein by reference in its entirety.

TECHNICAL FIELD

The present application relates generally to the processing of data, and, in various example embodiments, to systems, methods, and computer program products for facilitating social networking service connections via an ad hoc peer-to-peer network of mobile devices.

BACKGROUND

A mobile device (e.g., a mobile phone, a tablet, etc.) may be used to make and receive telephone calls over a radio link by connecting to a cellular network provided by a mobile phone operator. In addition to telephony, mobile devices also support a wide variety of other services such as text messaging, MMS, email, Internet access, short-range wireless communications, business applications, gaming, and photography.

To provide users with access to such services, the mobile communications of today often rely on a "hub-and-spoke" architecture or access to a centralized server to facilitate a connection or exchange of data between two mobile devices. In some instances, the dependency of mobile devices on a communication intermediary to facilitate a connection between the mobile devices may be unproductive, inefficient, or undesirable.

For example, a number of people attending a business meeting may be interested in exchanging business cards. The exchange of paper or electronic business card by the meeting attendees may interfere with the conducting of the business meeting or with the exchange of ideas. As such, the exchange of business cards may become a hindrance to accomplishing the goals of the meeting. While the exchange of paper business cards may have fallen out of favor with many people due to the tendency to lose such paper business cards, the traditional exchange of electronic business cards may be quite time consuming.

In some instances, the receiving meeting attendee may access one or more electronic business cards of the other attendees at one or more web sites hosted on one or more web servers. In other instances, a meeting attendee may transmit his or her electronic business card via email to the other meeting attendees. Because the traditional exchange of electronic business cards involves the transmitting and receiving of communications to and from a webserver or a mail server, the traditional exchange of electronic business cards may be inefficient, especially when the people exchanging the electronic business cards are in the same meeting. A better solution to allowing attendees at a meeting or any other event to learn about the people they meet at the event and to memorialize such interactions may be needed.

BRIEF DESCRIPTION OF THE DRAWINGS

Some embodiments are illustrated by way of example and not limitation in the figures of the accompanying drawings, in which.

DETAILED DESCRIPTION

Figure 1A:
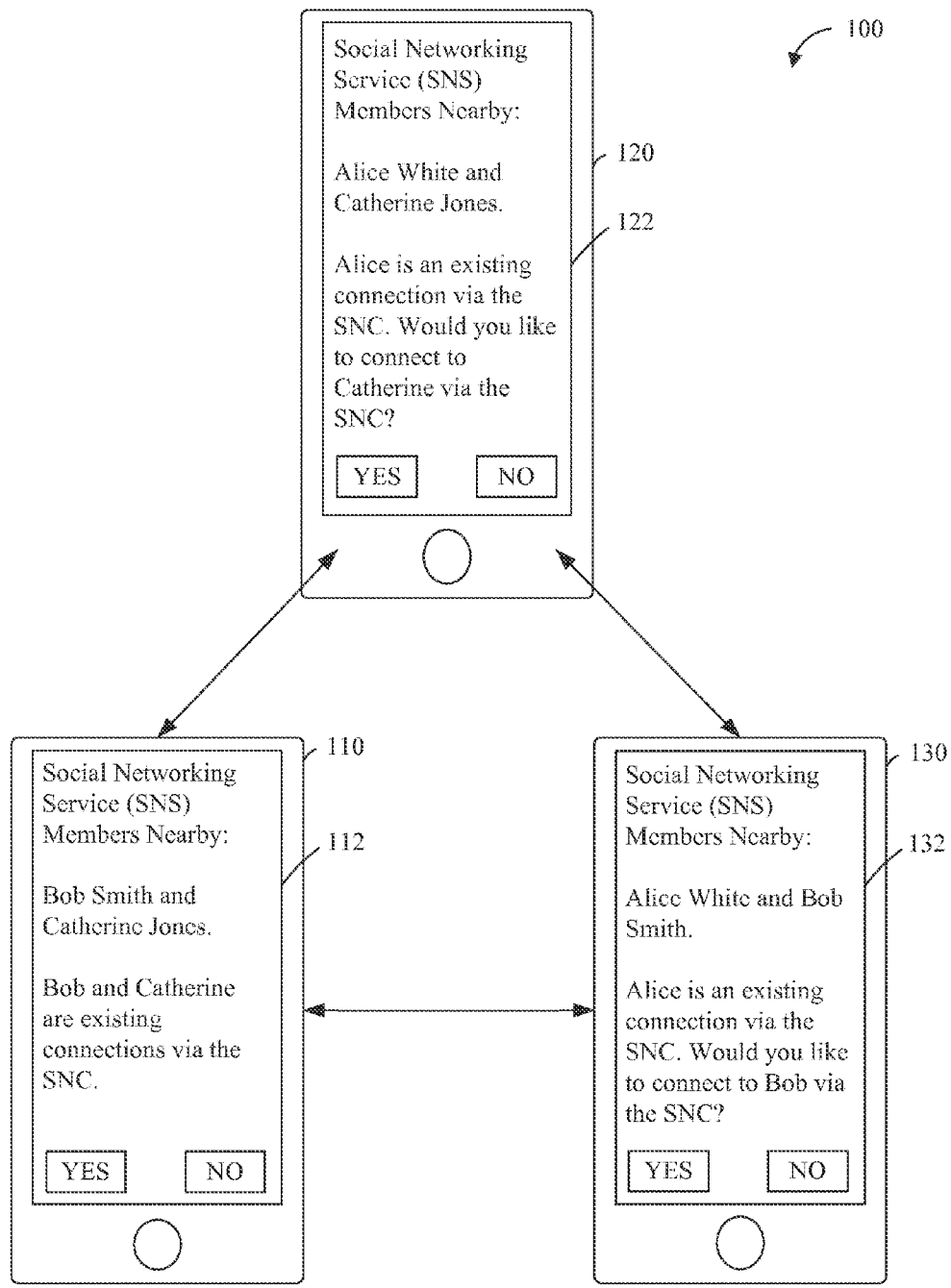
FIG. 1A is a diagram that illustrates an ad hoc peer-to-peer network of mobile devices, according to some example embodiments.

Example methods and systems for facilitating the establishing of an ad hoc peer-to-peer network of mobile devices associated with members of a social networking service and the establishing of social networking service connections between the members of the social networking service via the ad hoc peer-to-peer network of mobile devices are described. In the following description, for purposes of explanation, numerous specific details are set forth to provide a thorough understanding of example embodiments. It will be evident to one skilled in the art, however, that the present subject matter may be practiced without these specific details. Furthermore, unless explicitly stated otherwise, components and functions are optional and may be combined or subdivided, and operations may vary in sequence or be combined or subdivided.

The mobile device users who attend an event (e.g., a meeting, a conference, etc.) may find it beneficial to be able to view, in user interfaces of their mobile devices, information regarding the other attendees of the meeting. Such information may include the attendees' names and pictures, electronic business cards, profiles (e.g., titles, seniority, employer's name, decision maker, colleges attended, etc.) and other relevant information pertaining to the attendees of the meeting.

A plurality of mobile devices associated with a plurality of members of a social networking service (also "SNS"), such as LinkedIn™, may be configured to establish an ad hoc wireless peer-to-peer network (e.g., a session or a connection) that includes the plurality of mobile devices, and to transmit data between the connected mobile devices without the involvement of a server. A mobile device associated with a member of the social network and connected via the peer-to-peer network may exchange (e.g., transmit or receive) electronic business cards with the other mobile devices in the peer-to-peer network, transmit its user's member profile on the social networking service to the other mobile devices or receive other member profiles from the other mobile devices, transmit or receive invitations for members to chat via the ad hoc wireless peer-to-peer network, transmit or receive invitations for members to connect via the social networking service, establish social networking connections on the social networking service between members of the social networking service via the ad hoc wireless peer-to-peer network, display communications (e.g., communications that are about to be transmitted to other mobile devices via the peer-to-peer network or communications received from other mobile device via the peer-to-peer network), etc.

The establishing of an ad hoc wireless one-to-one connection or of a multi-peer connection among mobile devices without the use of a server may enhance the experiences of the users of the mobile devices who are attending the meeting, for example, by facilitating speedy interactions among the users, by providing information directly to the mobile devices included in the an ad hoc wireless peer-to-peer connection, or by providing prompts to establish social networking connections among the users. In some example embodiments, a mobile device of a meeting attendee may determine the identities of the other meeting attendees based on the identifiers (e.g., member identifiers) advertised to a local area by the mobile devices of the other meeting attendees. Also, the mobile device of a particular member may identify which of the other attending members are existing social networking service connections of the particular member, and may display the names of the existing connections in a user interface of the mobile device of the particular member.

Further, the mobile device may identify the members who are not connected via the social networking service and may prompt the respective members to connect via the social networking service. In addition, the mobile device may obtain information about the other attendees' backgrounds and display that information in the user interfaces of the mobile devices of the other attendees. The mobile device may also store the names and photographs of the meeting attendees, in some instances, in association with data that identifies certain attendees as being met, by the user of the mobile device, at the respective meeting for the first time. These and other functionalities of a mobile device connected via an ad hoc multi-peer network may allow the user of the device to take notes with reference to the speaker, identify the decision maker in the group, have chat sessions with other attendees during the meeting, learn about new people attending who were not scheduled to attend, remember the names of the attendees met at the respective meeting for the first time, match names to faces via photographs presented via the mobile device, etc.

Furthermore, in some example embodiments, the mobile device(s) may memorialize (e.g., store a record of) the activities that involved the mobile device(s), the ad hoc wireless peer-to-peer network, or both, on the mobile device(s) and/or in one or more records of a database associated with the social networking service (e.g., via a server of an interaction support system). For example, a record of the activity that pertains to the users of the mobile devices exchanging electronic business cards via the ad hoc wireless peer-to-peer network may be stored, by at least one of the involved mobile devices, as member activity and behavior data in a database associated with the social networking system.

In another example, the mobile device of the member Alice White and the mobile device of the member Bob Smith are connected via the peer-to-peer network. Alice's mobile device may display an identifier (e.g., the name and/or photograph) of Bob in a user interface of Alice's mobile device. Similarly, Bob's mobile device may display an identifier (e.g., the name and/or photograph) of Alice in a user interface of Bob's mobile device. Alice may request to connect with Bob via the social networking service by, for example, clicking on a "Connect" button displayed in the user interface of Alice's mobile device in association with the identifier of Bob. Alice's mobile device may transmit a communication including an invitation to connect with Bob on the social networking service to Bob's mobile device via the ad hoc wireless peer-to-peer network.

Alice's mobile device may also transmit a communication to a server associated with the social networking service. The communication to the server may indicate that Alice invited Bob to connect on the social networking service. The server may generate a database record that indicates that Alice has invited Bob to connect via the social networking service. In some example embodiments, the generating of the database record may allow the maintaining of an up-to-date list of invitations received by Bob. For example, if, upon receiving Alice's invitation to connect, Bob were to view a website associated with the social networking service, he may be able to see an indication of Alice's invitation to connect via the social networking service.

Bob may accept Alice's invitation to connect via the social networking service (e.g., by selecting an "Accept" button in the user interface of the Bob's mobile device). In response to the communication including the invitation to connect on the social networking service received from Alice's mobile device, Bob's mobile device may transmit a further (e.g., a second) communication including an acceptance of Alice's invitation to connect on the social networking service via the ad hoc wireless peer-to-peer network. Upon receiving the second communication from Bob's mobile device, Alice's mobile device may display an indication of Bob's acceptance of Alice's invitation to connect in the user interface of Alice's mobile device (e.g., "Bob accepted your invitation to connect via the SNS.").

Bob's mobile device may also transmit another communication to the server associated with the social networking service. The other communication to the server may indicate that Bob accepted Alice's invitation to connect on the social networking service. Based on the other communication, the server may generate another database record that indicates that Alice and Bob have established a connection via the social networking service. Further, the server may update the record(s) that pertain to the two members (e.g., Alice and Bob) in a social graph database to indicate the establishing of the new relationship between the two members of the social networking service. The new relationship between the two members may be represented by a new edge connecting a first graph node representing one of the two members (e.g., Alice) and a second graph node representing the other of the two members (e.g., Bob).

In certain example embodiments, the context or the physical circumstances associated with one or more members of the social network, at a particular time, may be leveraged (e.g., by the mobile devices or by an interaction support system) to facilitate context-aware, social-graph-based interactions between the members via the members' mobile devices. According to one example, based on access to a member's calendar, geolocation (e.g., GPS) data, member profile data, or a suitable combination thereof, one or more mobile devices of the attending members or the interaction support system may identify the people that a particular member is likely to meet at a scheduled event. The mobile devices or the interaction support system may provide the names, email addresses, or other additional data determined (e.g., by the mobile devices or by the interaction support system) to be pertinent to the meeting or useful to a particular member. During the meeting, the mobile devices of the attending members may automatically establish a multi-peer connection between the mobile devices and facilitate the transmission of data (e.g., electronic business cards) between the attending members. A record of the attendees and the data transmitted may be stored on one or more of the mobile devices of the members attending the meeting. In some instances, the record of the attendees and the data transmitted may be stored in a database associated with the interaction support system.

In some example embodiments, a plurality of mobile devices that have WiFi™ or Bluetooth® capabilities activated and that are located within a particular distance from each other may discover each other and may establish one or more ad hoc wireless peer-to-peer connections (e.g., one or more wireless peer-to-peer networks) among themselves, all without the involvement of an intermediary entity (e.g., a server). Some or all of the functionalities associated with the establishing of the one or more wireless peer-to-peer connections among the mobile devices may be performed by one or more modules associated with one or more copies of an application executed on the respective mobile devices.

In some example embodiments, a user of a mobile device that hosts a copy of such an application interacts with the copy of the application via a user interface of the mobile device when configuring one or more settings associated with the copy of the application. The user may specify that the mobile device may automatically establish ad hoc wireless peer-to-peer networks with other mobile devices that host other copies of the application. Based on the configuration provided by the user of the mobile device, the mobile device may participate in the establishing of one or more wireless peer-to-peer connections with other mobile devices discovered in a local area. The wireless peer-to-peer connections among a plurality of mobile devices may be established ad hoc (e.g., without planning) based on the plurality of mobile devices being within a distance from each other and discovering the presence of each other.

For example, a particular mobile device may broadcast (or advertise) its availability to establish wireless peer-to-peer connections with one or more other mobile devices located within a particular distance from the particular mobile device. The one or more other mobile devices, may receive the broadcast of the particular mobile devices, may respond to the broadcast, and may participate in the establishing of the wireless peer-to-peer connections among the mobile devices. In some instances, the mobile devices may facilitate the establishing of the wireless peer-to-peer connections with the other advertising mobile devices based on determining that the users associated with the other mobile devices are members of the social networking service.

In some example embodiments, the iBeacon™ technology provided by Apple Inc. may be used by a plurality of mobile devices to facilitate the establishment of an ad hoc wireless peer-to-peer connection among the plurality of mobile devices using Bluetooth® low energy proximity sensing. The plurality of mobile devices may be both transmitting (e.g., broadcasting, advertising, etc.) communications to other mobile devices in a local area and receiving communications from the other mobile devices in the local area. As such, the advertising mobile device and the listening mobile device may have both advertising and listening capabilities.

According to certain example embodiments, one or more of the mobile devices host copies of an application that performs one or more of the functionalities associated with establishing the wireless ad hoc peer-to-peer connection. The copies of the application may associate the one or more mobile devices with a universally unique identifier (UUID) for purposes of identifying other mobile devices in the local area that have the same UUID and facilitating the establishing of an ad hoc wireless peer-to-peer network among a plurality of mobile device in the local area.

For example, a mobile device broadcasts a communication including a UUID to a local area. The mobile device may also broadcast a major number and a minor number. The major and minor numbers may be mapped to a member identifier associated with the advertising device by a listening mobile device. The member identifier may be generated, in some instances, upon the user of the advertising mobile device being authenticated by the advertising mobile device (e.g., based on login data provided by the user). According to some example embodiments, without determining that the user's login data maps to a valid member identifier, the advertising mobile device may not advertise its availability to participate in establishing (or joining) the ad hoc wireless peer-to-peer network.

The transmitted UUID may be picked up by another mobile device that is listening for UUIDs. In some example embodiments, the other mobile device (e.g., the listening mobile device) determines that the UUID received from the transmitting mobile device is the same as its own UUID. Upon matching the received UUID and its own UUID, the listening mobile device may access and map a combination of the major and minor numbers received from the transmitting mobile device to a member identifier of a particular member of a social networking service. In some example embodiments, the major and minor numbers are encrypted at the advertising mobile device, and are decrypted at a listening mobile device. In some instances, if the listening mobile device does not match the received UUID with its own UUID, the listening mobile device may not access (or decrypt) the major and minor numbers.

The member identifier of the particular member may be associated with the advertising mobile device. The listening mobile device may determine that the user associated with the advertising mobile device is a member of the social networking service. In some example embodiments, a plurality of mobile devices may participate in the establishing of a wireless peer-to-peer connection among themselves based on determining that the users associated with the respective mobile devices are members of the social networking service. In some example embodiments, a listening mobile device participates in establishing (or joining) an ad hoc wireless peer-to-peer network only with transmitting mobile devices that are associated with the same UUID as the listening mobile device.

The iBeacon™ technology may allow the determination of the proximity of certain mobile device. For example, a particular mobile device may determine, based on the advertising transmitted by another mobile device, whether the other device is in an immediate proximity to the particular mobile device, is near the particular mobile device, or is far from the mobile device. For example, the particular mobile device may determine a received signal strength indicator (RSSI) value associated with a radio signal received from the other mobile device. The particular mobile device may identify a distance value between the particular mobile device and the other mobile device based on the RSSI value.

In some example embodiments, if the distance between two mobile devices is determined by a mobile device to not exceed a threshold value (e.g., a proximity threshold value), the two mobile devices automatically establish the wireless peer-to-peer connection between the two mobile devices. In certain example embodiments, if the distance between two mobile devices is determined by a mobile device to exceed the threshold value, the two mobile devices issue queries displayed to the users associated with the respective mobile devices. The queries may, for example, be in the form of a question regarding the connecting to the other mobile device (e.g., "Would you like to connect to the mobile device of John Doe?" or "Would you like to connect to John Doe?").

In various example embodiments, a plurality of mobile devices may utilize the multi-peer connectivity technology to facilitate the establishment of a wireless peer-to-peer connection among the plurality of mobile devices. The multi-peer connectivity technology may allow mobile devices to send connection requests, accept connection requests, facilitate chatting among the users of the connected mobile devices, send files, etc.

During the initial, discovery phase of the establishing of a multi-peer session, a plurality of mobile devices advertise their peer identifier (ID) and receive the peer IDs of other mobile devices from other mobile devices located at a particular distance from each other. In some instances, the peer ID is a member identifier (ID). In other instances, the peer ID identifies a particular mobile device, and may be mapped to the member ID of the user associated with the particular mobile device.

Upon discovering each other, the plurality of mobile devices may automatically establish connections among all the discovered mobile devices that advertised their peer IDs. The connections are established locally, peer-to-peer (e.g., mobile device to mobile device), without the involvement of the server. The mobile devices may display a number of identifiers of the users associated with the connected peers (e.g., the mobile devices) in user interfaces of the mobile devices. The peers may join the session and may leave the session. When a peer leaves the session, the peer is dropped out of the pool of connections, and the number of connected users that may be seen on the screen of each remaining mobile device is decreased to indicate that a particular peer has left the session.

FIG. 1 is a diagram 100 that illustrates an ad hoc peer-to-peer network of mobile devices, according to some example embodiments. The ad hoc peer-to-peer network of mobile devices may include two or more mobile devices of various types. As shown in FIG. 1, mobile devices 110, 120, and 130 are smartphones. In certain example embodiments, one or more of the mobile devices that may facilitate a wireless peer-to-peer connection among mobile devices may be wearable devices, tablets, or other mobile devices. In some instances, a wearable device is a stand-alone or independent device. In some instances, the wearable device is an accessory-like device that works in conjunction with another mobile device (e.g., a smart phone). For example, the wearable device may be an Input/Output (I/O) device for an application executed on a smart phone.

According to certain example embodiments, the peer-to-peer connection among a plurality of mobile devices is established automatically based on the users associated with the respective mobile devices previously configuring copies of a particular application (e.g., a social networking application) hosted on their mobile devices to automatically establish the wireless peer-to-peer connections. In some example embodiments, the mobile device 110 advertises (e.g., broadcasts) a first identifier to a local area. The first identifier, in some instances, is a device identifier of the mobile device 110. In other instances, the identifier is a member identifier of the member of the social network, associated with the mobile device 110. The mobile device 110 may broadcast the first identifier via a transceiver of the mobile device 110.

Similarly, the mobile devices 120 and 130 may advertise (e.g., broadcast) a second identifier and a third identifier of the mobile device 120 and the mobile device 130, respectively, to the local area. The second and third identifiers, in some instances, are device identifiers of the mobile devices 120 and 130, respectively. In other instances, the second and third identifiers are member identifiers of the members of the social network, associated with the mobile device 120 and 130, respectively. In some example embodiments, the advertised identifiers may be referenced in the communications broadcast (e.g., transmitted) by the mobile devices 110, 120, or 130, respectively.

In addition to broadcasting communications, the mobile device 110 listens to communications broadcast by other mobile devices (e.g., the mobile devices 120 and 130) located within the proximity (e.g., a local area or a particular distance) of the mobile device 110. Similarly, the mobile devices 120 and 130 listen to communications broadcast by other mobile devices located within the proximity of the mobile devices 120 and 130, respectively, e.g., the mobile device 110 and 130, for the mobile device 120, and the mobile devices 110 and 120, for the mobile device 130.

When the mobile device 110 discovers an advertising device (e.g., the mobile device 120 or the mobile device 130), the mobile device 110 may send a request to the advertising device to establish a wireless peer-to-peer connection, which the advertising device may accept or decline. In some example embodiments, a mobile device makes the determination whether to accept or decline the request to establish the peer-to-peer connection based on the configuration settings associated with the application executed on the mobile device.

In some instances, when the configuration settings (e.g., provided by the user of the mobile device) specify a permission to automatically establish the peer-to-peer connections, the mobile device may automatically establish the wireless peer-to-peer connection with the requesting mobile device(s) in response to the received request(s) to establish the wireless peer-to-peer connection. In other instances, when the configuration settings do not specify a permission to automatically establish the peer-to-peer connections, the mobile device generates and presents a communication to the user of the mobile device via a user interface of the mobile device. The communication may, for example, be in the form of a question regarding the connecting to the other mobile device (e.g., "Would you like to connect to the mobile device of John Doe?" or "Would you like to connect to John Doe?")

By accepting the invitation to connect, a session is established and the mobile devices may start communicating. The mobile devices may communicate by transmitting data, such as images, video, texts, etc.

The session (or peer-to-peer connection, or peer-to-peer network) may be established between two or more peers (e.g., mobile devices). For example, as shown in FIG. 1, the mobile devices 110, 120, and 130 are included in the multi-peer connection established by the mobile devices 110, 120, and 130. If one of the mobile devices leaves the session, the session may be maintained as long as at least two mobile devices are still connected.

As shown in FIG. 1, the mobile device 110 displays a user interface 112 to a first user associated with the mobile device 110. Similarly, the mobile device 120 displays a user interface 122 to a second user associated with the mobile device 120, and the mobile device 130 displays a user interface 132 to a third user associated with the mobile device 130. The mobile devices 110, 120, and 130 may display a variety of information in the user interfaces 112, 122, or 132, respectively.

In addition to discovering other mobile devices with which to connect, the mobile devices may facilitate interactions by the users associated with the mobile devices. In various example embodiments, the mobile devices may provide the users of the respective mobile devices with information regarding the wireless peer-to-peer session established among the respective mobile devices (e.g., which users are still connected). In some example embodiments, a mobile device may generate a message for the user of the mobile device to trigger an action by the user (e.g., the transmitting of a text message to another user associated with another mobile device, the transmitting of an invitation to connect via the social networking service, etc.). In certain example embodiments, a first mobile device may respond to a query generated by a second mobile device. The query may pertain to the user associated with the first mobile device. These and other items of content generated by the mobile devices may be displayed by the mobile devices in one or more user interfaces of the mobile devices connected wirelessly via the peer-to-peer session.

For example, as shown in FIG. 1, the user interface 112 of the mobile device 110 may inform the first user about the members of the social networking service who are discovered (e.g., by the mobile device 110) to be in a proximity to the mobile device 110 by displaying a statement such as "Social Networking Service (SNC) Members Nearby: Bob Smith and Catherine Jones." The member Bob Smith may be the second user associated with the mobile device 120, and the member Catherine Jones may be the third user associated with the mobile device 130. In some instances, the user interface 112 may also indicate that one or more of the discovered nearby members are existing connections of the first user via the social networking service (e.g., "Bob and Catherine are existing connections via the SNC.").

Similarly, the user interface 122 of the mobile device 120 may inform the second user about the members of the social networking service who are discovered (e.g., by the mobile device 120) to be in a proximity to the mobile device 120 by displaying a statement such as "Social Networking Service (SNC) Members Nearby: Alice White and Catherine Jones." The member Alice White may be the first user associated with the mobile device 110, and the member Catherine Jones may be the third user associated with the mobile device 130. In some instances, the user interface 122 may also indicate that one or more of the discovered nearby members are existing connections of the first user via the social networking service (e.g., "Alice is an existing connection via the SNC."). The mobile device 120 may generate and display a further message such as "Would you like to connect to Catherine via the SNC?" via the user interface 122. The mobile device 120 may receive input from the second user via the user interface 122 in response to the further message displayed to the second user. For example, the second user (e.g., the member Bob Smith) may provide a command to send an invitation to connect to the member Catherine Jones (e.g., the third user) by selecting (e.g., clicking on) the further message displayed in the user interface 122.

Similarly, the user interface 132 of the mobile device 130 may inform the third user about the members of the social networking service who are discovered (e.g., by the mobile device 130) to be in a proximity to the mobile device 130 by displaying a statement such as "Social Networking Service (SNC) Members Nearby: Alice White and Bob Smith." The member Alice White may be the first user associated with the mobile device 110, and the member Bob Smith may be the third user associated with the mobile device 120. In some instances, the user interface 122 may also indicate that one or more of the discovered nearby members are existing connections of the first user via the social networking service (e.g., "Alice is an existing connection via the SNC."). The mobile device 130 may generate and display a further message such as "Would you like to connect to Bob via the SNC?" via the user interface 132. The mobile device 130 may receive input from the second user via the user interface 132 in response to the further message displayed to the second user. For example, the third user (e.g., the member Catherine Jones) may provide a command to send an invitation to connect to the member Bob Smith (e.g., the second user) by selecting (e.g., clicking on) the further message displayed in the user interface 132.

In certain example embodiments one or more of the mobile devices illustrated in FIG. 1 may be clients in a client-server system. One or more of the mobile devices 110, 120, and 130 may transmit and receive communications to and from a server associated with the social networking service. For example, the mobile device 110 may send a request for information about one of the users associated with the other mobile devices (e.g., the social networking service member associated with the mobile device 120 or the social networking service member the mobile device 130).

Figure 1B:
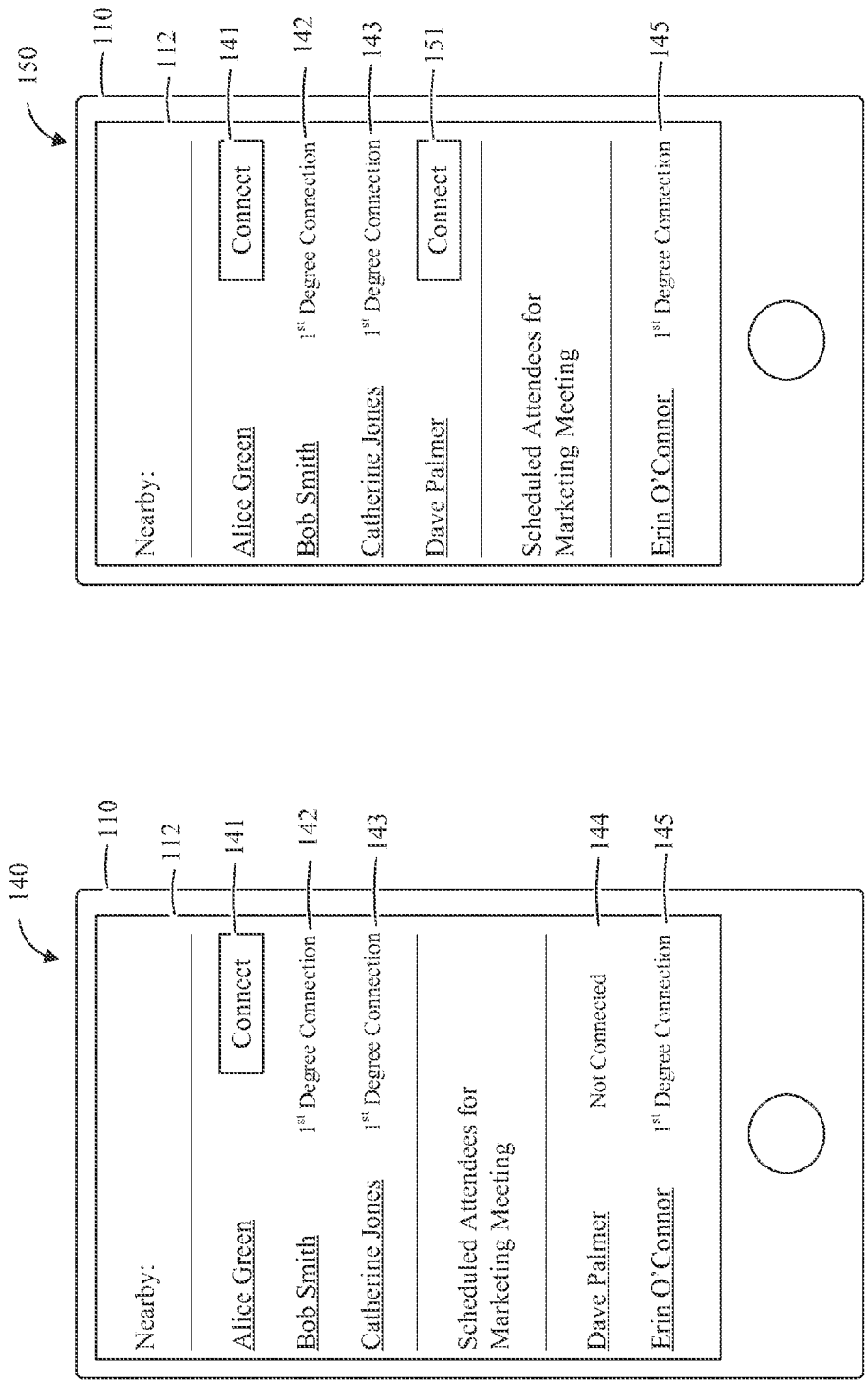
FIG. 1B is a diagram that illustrates an example user interface of a mobile device at different times, according to some example embodiments.

FIG. 1B is a diagram that illustrates an example user interface of a mobile device at different times, according to some example embodiments. As shown in FIG. 1B, at time 140, the user interface 112 of the mobile device 110 displays a number of identifiers (e.g., names, images, or both) of various members of the social networking service whose mobile devices are determined (e.g., by the mobile device 110) to be in a vicinity of the mobile device 110. The mobile device 110 and one or more of the mobile devices discovered to be in the vicinity of the mobile device 110 may or may not be connected via an ad hoc wireless peer-to-peer network.

For example, as shown in FIG. 1B, the user interface 112 lists Alice Green, Bob Smith, and Catherine Jones as being nearby. In some instances, the group of members present nearby are determined by the mobile device 110 to be attendees at an event (e.g., the attendees present at a scheduled marketing meeting). The determining may be based on calendar data pertaining to the member associated with the mobile device 110. Of these members, Bob Smith and Catherine Jones are identified as first degree connections of the member associated with the mobile device 110. Because Alice Green is determined to not be a social networking service connection of the member associated with the mobile device 110, the mobile device 110 prompts the member associated with the mobile device 110 to connect with Alice Green via the social networking service, by displaying a "Connect" button 141 in the user interface 112.

As shown in FIG. 1B, at time 140, the user interface 112 of the mobile device 110 also displays a number of identifiers of members of the social networking service who are scheduled to attend a marketing meeting but who are not yet present. For example, the user interface 112 lists Dave Palmer and Erin O'Connor as scheduled attendees for the marketing meeting. Because Dave Palmer is determined to not be a social networking service connection of the member associated with the mobile device 110, the mobile device 110 identifies Dave Palmer as "not connected" (e.g., item 144). Since the mobile device 110 determines Erin O'Connor to be a first degree connection of the member associated with the mobile device 110, the identifier "Erin O'Connor" is listed as a first degree connection (e.g., item 145).

As shown in FIG. 1B, at a later time 150, the user interface 112 of the mobile device 110 is updated to list Dave Palmer as present nearby (e.g., at the scheduled event). In some instances, the user interface 112 is updated when a new mobile device is discovered to be present in a local area. For example, when Dave Palmer has joined the scheduled marketing meeting, the mobile device 110 determines that the mobile device associated with Dave Palmer is present in the local area associated with the mobile device 110 (e.g., Dave Palmer's mobile device has joined the ad hoc wireless peer-to-peer network), and updates the user interface 112 to reflect Dave Palmer's joining the marketing meeting.

The mobile device 110 may also determine that Dave Palmer is not connected with the user of the mobile device 100 via the social networking service. The mobile device 110 may prompt, at the time 150, the user of the device 110 to connect with Dave Palmer by displaying a "Connect" button 151 in the user interface 112.

In some example embodiments, by selecting (e.g., clicking on) one or more of the identifiers of one or more members presented in the user interface 112 of the mobile device 110, the user of the mobile device 110 may request the display of additional information pertaining to the one or more members. For example, in response to the user of the mobile device 110 clicking on the "Alice Green" identifier in the user interface 112 (at the time 140 or the time 150), the mobile device 110 may access the member profile information of Alice Green and may display Alice Green's member profile in a user interface of the mobile device 110. In some example embodiments, the member profile information of Alice Green may be received from the mobile device associated with Alice Green via the wireless ad hoc peer-to-peer network that includes the mobile device 110 and the mobile device associated with Alice Green.

In some example embodiments, before displaying an identifier of a particular member associated with a particular mobile device discovered in a local area in the user interface 112, the mobile device 110 determines a received signal strength indicator (RSSI) value associated with a radio signal received from the particular mobile device. If the mobile device 110 determines the RSSI value to not exceed a proximity threshold value, then the identifier of the particular member associated with the particular mobile device is displayed as a nearby member in the user interface 112. In some instances, identifiers of users of mobile devices determined to be too far from the mobile device 110 (e.g., in a next room) are not displayed to the user of the mobile device 110.

Figure 2:
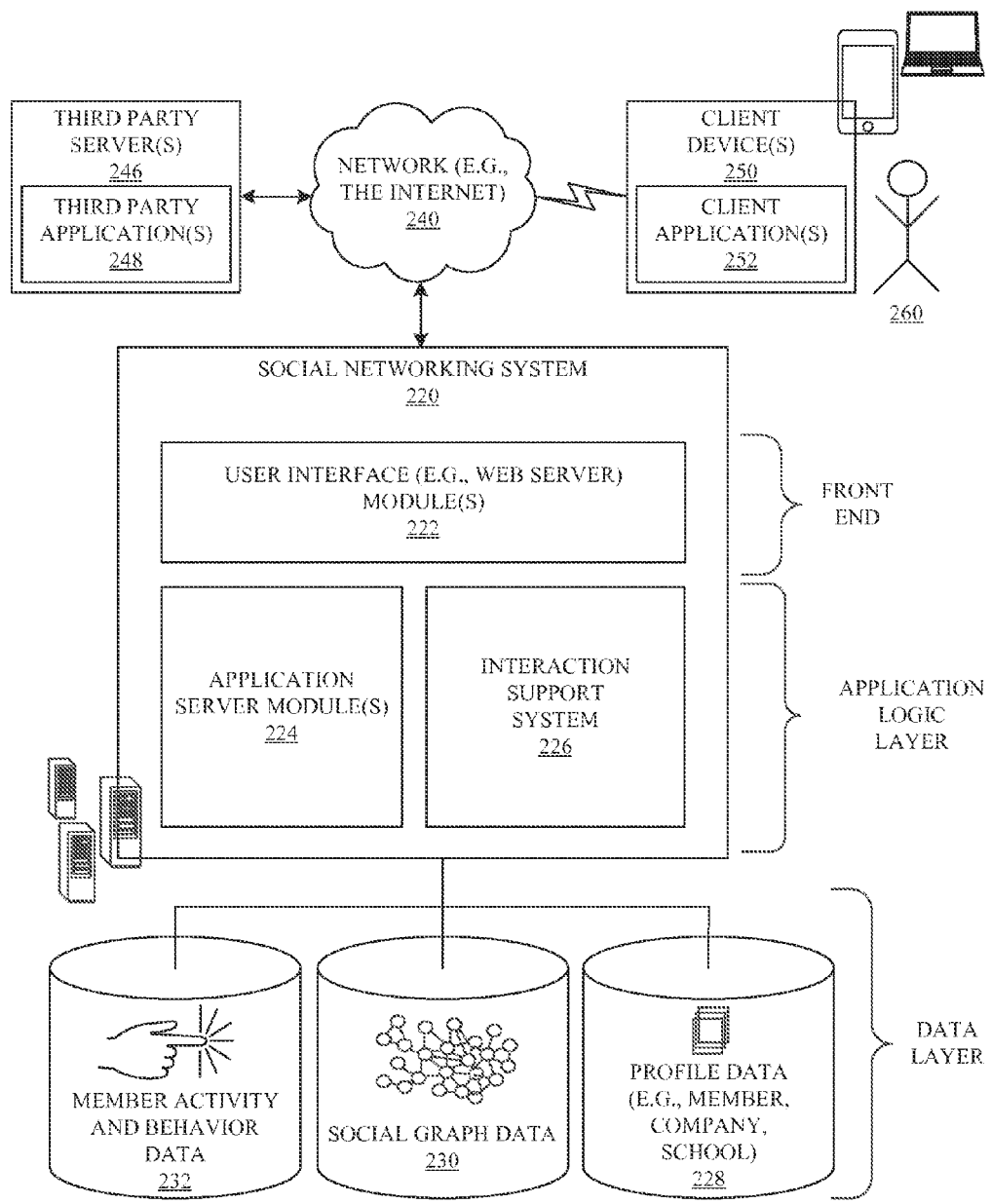
FIG. 2 is a network diagram illustrating a client-server system, according to some example embodiments.

An example method and system for facilitating the establishing of an ad hoc peer-to-peer network of mobile devices associated with members of a social networking service and the establishing of social networking service connections between the members of the social networking service via the ad hoc peer-to-peer network of mobile devices may be implemented in the context of the client-server system illustrated in FIG. 2. As shown in FIG. 2, the social networking system 220 is generally based on a three-tiered architecture, consisting of a front-end layer, application logic layer, and data layer. As is understood by skilled artisans in the relevant computer and Internet-related arts, each module or engine shown in FIG. 2 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 2. However, a skilled artisan will readily recognize that various additional functional modules and engines may be used with a social networking system, such as that illustrated in FIG. 2, to facilitate additional functionality that is not specifically described herein. Furthermore, the various functional modules and engines depicted in FIG. 2 may reside on a single server computer, or may be distributed across several server computers in various arrangements. Moreover, although depicted in FIG. 2 as a three-tiered architecture, the inventive subject matter is by no means limited to such architecture.

As shown in FIG. 2, the front end layer consists of a user interface module(s) (e.g., a web server) 222, which receives requests from various client-computing devices including one or more client device(s) 250, and communicates appropriate responses to the requesting device. For example, the user interface module(s) 222 may receive requests in the form of Hypertext Transport Protocol (HTTP) requests, or other web-based, application programming interface (API) requests. The client device(s) 250 may be executing conventional web browser applications and/or applications (also referred to as "apps") that have been developed for a specific platform to include any of a wide variety of mobile computing devices and mobile-specific operating systems (e.g., iOS™, Android™, Windows® Phone).

For example, client device(s) 250 may be executing client application(s) 252. The client application(s) 252 may provide functionality to present information to a user and to participate in establishing wireless peer-to-peer networks with other client application(s) 252 executed on other client device(s) 250. The client application(s) 252 may also provide functionality to communicate via the network 240 to exchange information with the social networking system 220 or with other client application(s) 252 executed on other client device(s) 250. Each of the client devices 250 may comprise a computing device that includes at least a display and communication capabilities with the network 240 to access the social networking system 220 or other client device(s) 250. The client devices 250 may comprise, but are not limited to, remote devices, work stations, computers, general purpose computers, Internet appliances, hand-held devices, wireless devices, mobile, devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, wearable devices (e.g., head-mounted displays), smart watches, and the like. One or more users 260 may be a person, a machine, or other means of interacting with the client device(s) 250. The user(s) 260 may interact with the social networking system 220 or with other user(s) 260 via the client device(s) 250. The user(s) 260 may not be part of the networked environment, but may be associated with client device(s) 250.

As shown in FIG. 2, the data layer includes several databases, including a database 228 for storing data for various entities of a social graph. In some example embodiments, a "social graph" is a mechanism used by an online social network service (e.g., provided by the social networking system 220) for defining and memorializing, in a digital format, relationships between different entities (e.g., people, employers, educational institutions, organizations, groups, etc.). Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.). The data for various entities of the social graph may include member profiles, company profiles, educational institution profiles, as well as information concerning various online or offline groups. Of course, with various alternative embodiments, any number of other entities may be included in the social graph, and as such, various other databases may be used to store data corresponding to other entities.

Consistent with some embodiments, when a person initially registers to become a member of the social networking service, the person is prompted to provide some personal information, such as the person's name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 228.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a uni-lateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, items of content, and user interfaces of the social networking system 220, information relating to the member's activity and behavior (e.g., data pertaining to the member selecting or clicking on an online ad) may be stored in a database, such as database 232.

The social networking system 220 may provide a broad range of other applications and services that allow members the opportunity to share and receive information, often customized to the interests of the member. For example, with some embodiments, the social networking system 220 may include a photo sharing application that allows members to upload and share photos with other members. With some embodiments, members of the social networking system 220 may be able to self-organize into groups, or interest groups, organized around a subject matter or topic of interest. With some embodiments, members may subscribe to or join groups affiliated with one or more companies. For instance, with some embodiments, members of the social network service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of database 230. The social graph data may be stored in the database 230 in one or more graph data structures. The graph data structures may utilize nodes (e.g., for entities), edges (e.g., for connections or relationships between entities), and properties to represent and store the data pertaining to different types of relationships that may exist between different entities.

The application logic layer includes various application server module(s) 224, which, in conjunction with the user interface module(s) 222, generates various user interfaces with data retrieved from various data sources or data services in the data layer. With some embodiments, individual application server modules 224 are used to implement the functionality associated with various applications, services, and features of the social networking system 220. For instance, a messaging application, such as an email application, an instant messaging application, or some hybrid or variation of the two, may be implemented with one or more application server modules 224. A photo sharing application may be implemented with one or more application server modules 224. A search engine that searches for items of content pertaining to users of the client device(s) 250 based on queries received from other client device(s) 250 may be implemented with one or more application server modules 224. Similarly, the search engine may enable users to search for and browse member profiles. Of course, other applications and services may be separately embodied in their own application server modules 224. As illustrated in FIG. 2, social networking system 220 may include the interaction support system 226, which is described in more detail below.

Additionally, a third party application(s) 248, executing on a third party server(s) 246, is shown as being communicatively coupled to the social networking system 220 and the client device(s) 250. The third party server(s) 246 may support one or more features or functions on a website hosted by the third party.

Figure 3:
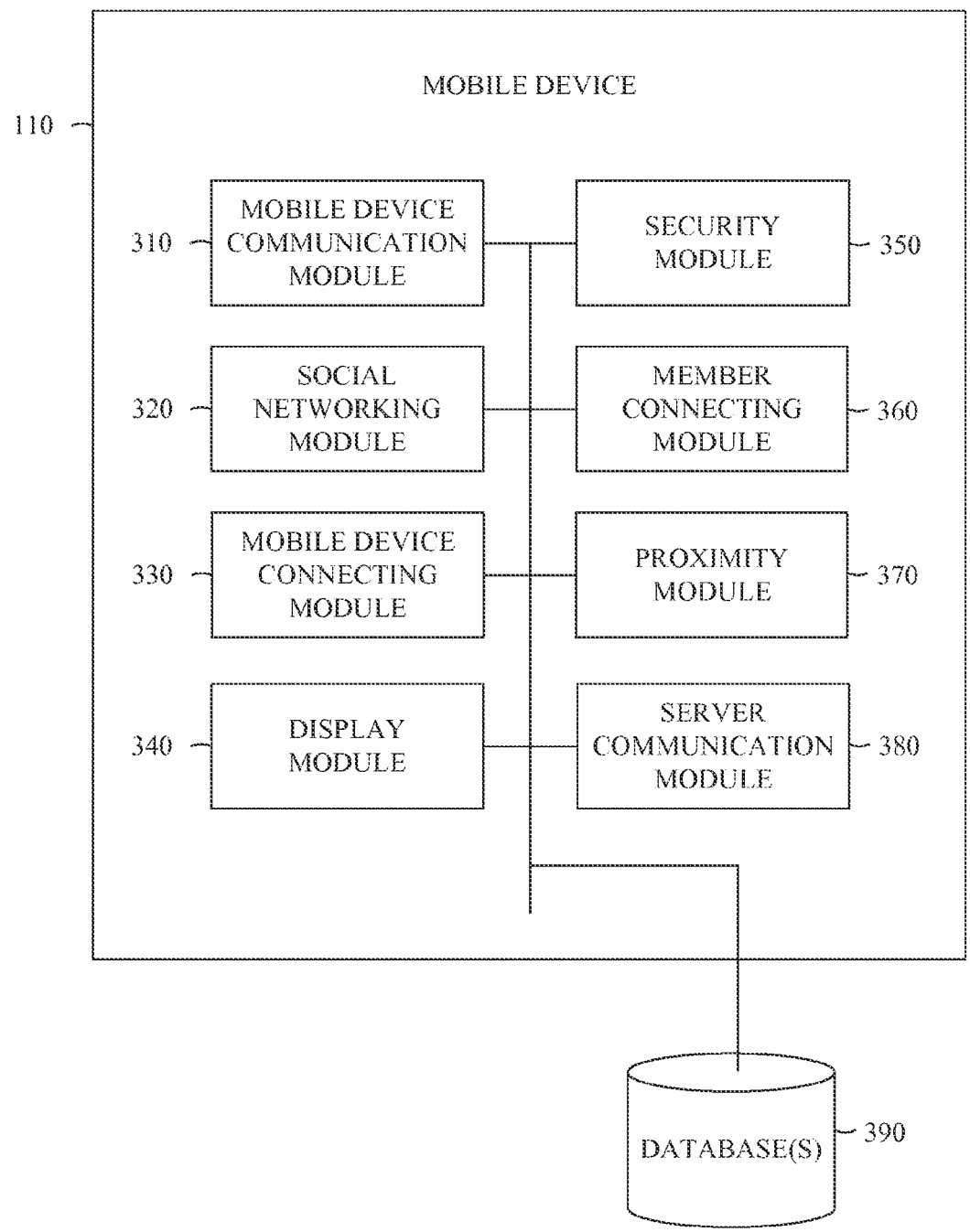
FIG. 3 is a block diagram illustrating components of a mobile device, according to some example embodiments.

FIG. 3 is a block diagram illustrating components of the mobile device 110, according to some example embodiments. As shown in FIG. 3, the mobile device 110 may include a mobile device communication module 310, a social networking module 320, a mobile device connecting module 330, a display module 340, a security module 350, a member connecting module 360, a proximity module 370, and a server communication module 380, all configured to communicate with each other (e.g., via a bus, shared memory, or a switch).

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, so as to allow information to be passed between the applications so as to allow the applications to share and access common data. Furthermore, the modules may access one or more databases 390 (e.g., the database 228, the database 230, or the database 232).

Figure 4:
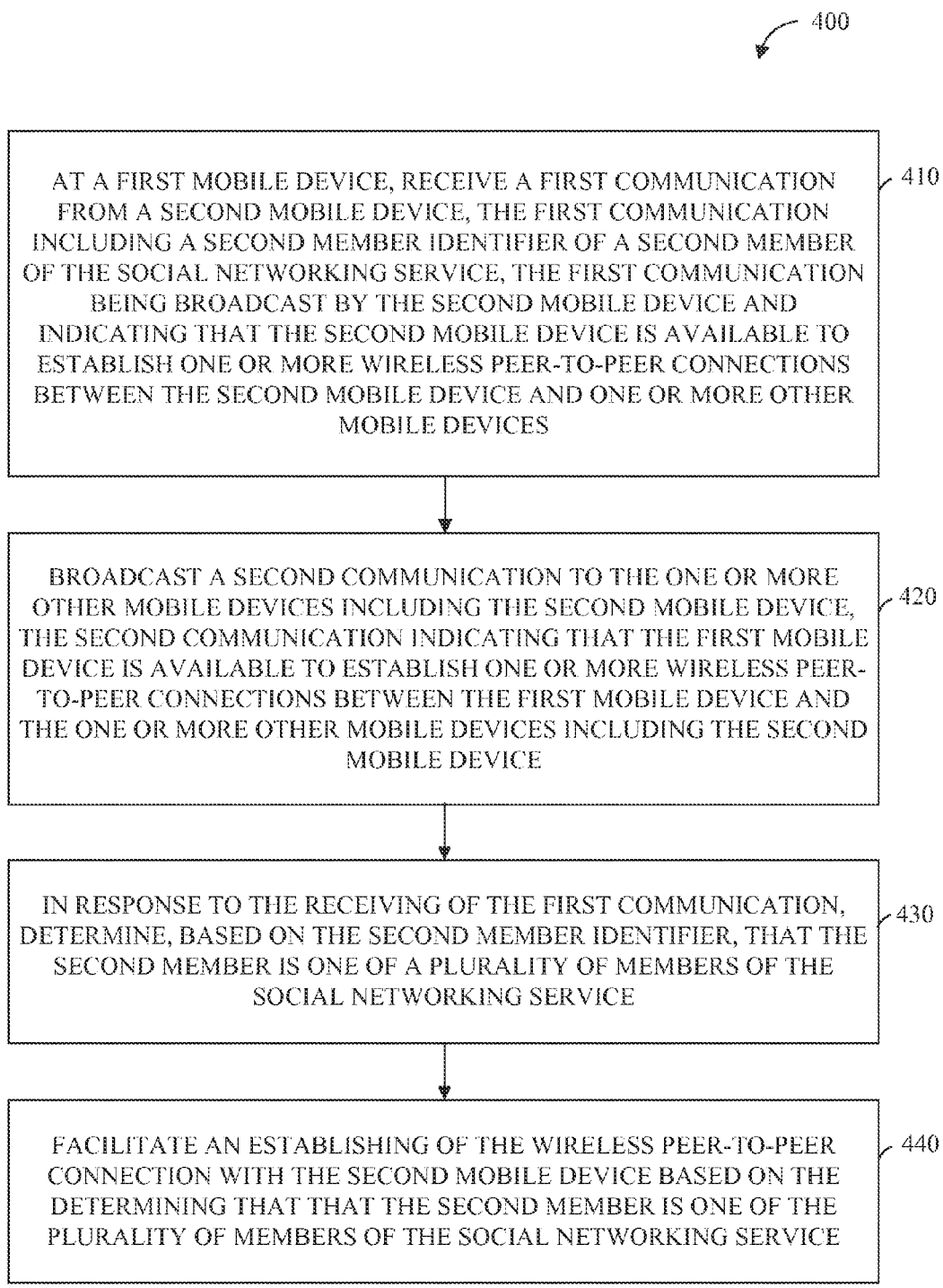
FIG. 4 is a flowchart illustrating a method for facilitating the establishing of a wireless peer-to-peer network between mobile devices, according to some example embodiments.

FIGS. 4-13 are flowcharts of a method for facilitating the establishing of a wireless peer-to-peer network between mobile devices, according to some example embodiments. Operations in the method 400 may be performed using modules described above with respect to FIG. 3. As shown in FIG. 4, the method 400 may include one or more of operations 410, 420, 430, and 440.

At method operation 410, the mobile device communication module 310, at a first mobile device, receives a first communication from a second mobile device. The first mobile device may be associated with a first member identifier of a first member of a social networking service. The first mobile device may receive the first communication via a transceiver of the first mobile device. The first communication may reference (e.g., include) a second member identifier of a second member of the social networking service. The second member identifier may be associated with the second mobile device. The first communication may be broadcast (e.g., advertised) by the second mobile device and may indicate that the second mobile device is available to establish one or more wireless peer-to-peer connections between the second mobile device and one or more other mobile devices. In some example embodiments, the first communication may include a request to establish the wireless peer-to-peer connection with the second mobile device.

At method operation 420, the mobile device communication module 310, at the first mobile device, broadcasts a second communication to the one or more other mobile devices including the second mobile device. The broadcasting of the second communication may be performed via the transceiver of the first mobile device. The broadcasting of the second communication may be performed by the first mobile device before, during, or after the broadcasting of the first communication by the second mobile device. The second communication may include the first member identifier of the first member of the social networking service. The second communication may indicate that the first mobile device is available to establish one or more wireless peer-to-peer connections between the first mobile device and the one or more other mobile devices including the second mobile device.

At method operation 430, the social networking module 320, at the first mobile device, determines that the second member is one of a plurality of members of the social networking service. The determining that that the second member is one of a plurality of members of the social networking service may be based on the second member identifier advertised in the communication received from the second mobile device. The determining may be performed in response to the receiving of the first communication.

At method operation 440, the mobile device connecting module 330, at the first mobile device, facilitates an establishing of the wireless peer-to-peer connection with the second mobile device based on the determining that that the second member is one of the plurality of members of the social networking service. In some example embodiments, the facilitating of the establishing of the wireless peer-to-peer connection includes transmitting an acceptance of a request from the second mobile device to establish the wireless peer-to-peer connection with the second mobile device. The acceptance may be included in a third communication sent to the second mobile device by the first mobile device.

In some example embodiments, the display module 340 displays, in a user interface of the first mobile device, one or more member identifiers to indicate one or more established wireless peer-to-peer connections between the first mobile device and other mobile devices. The one or more established wireless peer-to-peer connections may include the wireless peer-to-peer connection with the second mobile device. The displaying of the second member identifier may represent the wireless peer-to-peer connection with the second mobile device.

In various example embodiments, the social networking module 320 determines, based on the second member identifier, that the second member is not a first-degree connection of the first member within the social graph associated with the first member. The social networking module 320 may also determine that a third member identifier associated with a third member of the social networking service and referenced in a third communication received from a third mobile device is a first-degree connection of the first member within the social graph associated with the first member. The display module 340 may indicate, in the user interface of the first mobile device, that the second member of the social networking service is not a first-degree connection within the social graph associated with the first member. The display module 340 may also indicate, in the user interface of the first mobile device, that the third member of the social networking service is a first-degree connection within the social graph associated with the first member.

Consistent with various example embodiments, the mobile device communication module 310 receives a third communication from a third mobile device via the transceiver of the first mobile device. The third communication may include a third member identifier of a third member of the social networking service. The third member identifier may be associated with the third mobile device. The third communication may be broadcast by the third mobile device and may indicate that the third mobile device is available to establish one or more wireless peer-to-peer connections between the third mobile device and one or more other mobile devices.

In response to the receiving of the third communication, the social networking module 320 may determine, based on the third member identifier, that the third member is one of a plurality of members of the social networking service. The mobile device connecting module 330 may, in some instances, facilitate the third mobile device joining the wireless peer-to-peer connection established between the first and second mobile devices based on the determining that that the third member is one of the plurality of members of the social networking service. In other instances, the mobile device connecting module 330 may facilitate an establishing of a further wireless peer-to-peer connection with the third mobile device based on the determining that that the third member is one of the plurality of members of the social networking service.

In some example embodiments, the display module 340 displays a number of member identifiers including the second member identifier and the third member identifier in a user interface of the first mobile device. The second member identifier and the third member identifier may identify the second mobile device and the third mobile device as being wirelessly connected to the first mobile device via one or more wireless peer-to-peer connections. The mobile device connecting module 330 may determine that the second mobile device has interrupted the wireless peer-to-peer connection with the first mobile device. The display module 340 may update the member identifiers displayed in the user interface of the first mobile device based on the determining that the second mobile device has interrupted the wireless peer-to-peer connection with the first mobile device. Further details with respect to the method operations of the method 400 are described below with respect to FIGS. 5-13.

Figure 5:
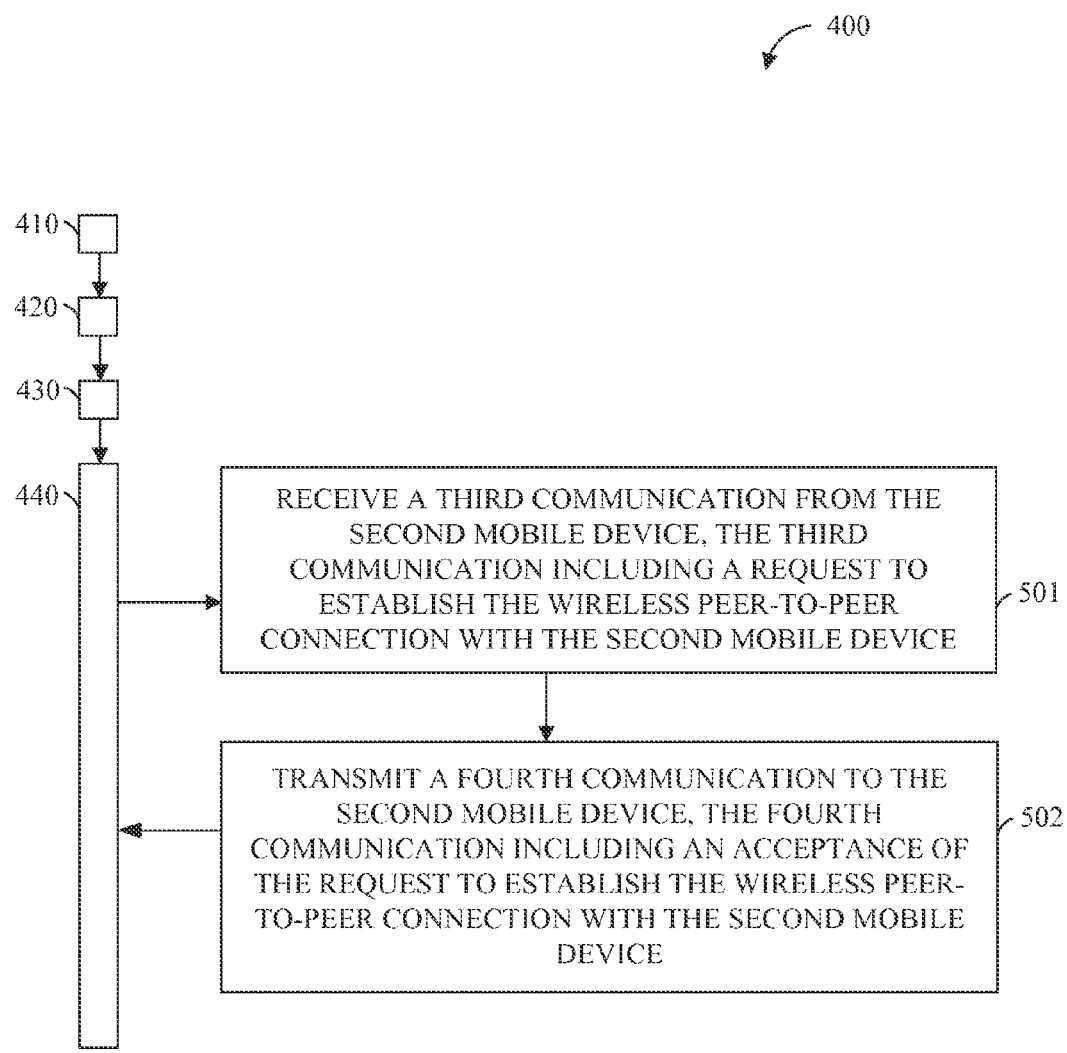
FIG. 5 is a flowchart that illustrates a method for facilitating the establishing of a wireless peer-to-peer network between mobile devices and represents the step 440 of the method illustrated in FIG. 4 in more detail, according to some example embodiments.

As shown in FIG. 5, the method 400 may include one or more of method operations 501 and 502, according to some example embodiments. Method operation 501 may be performed as part (e.g., a precursor task, a subroutine, or a portion) of method operation 440, in which the mobile device connecting module 330, at the first mobile device, facilitates an establishing of the wireless peer-to-peer connection with the second mobile device based on the determining that that the second member is one of the plurality of members of the social networking service. At method operation 501, the mobile device connecting module 330 receives a third communication from the second mobile device. The third communication may include a request to establish the wireless peer-to-peer connection with the second mobile device.

Method operation 502 may be performed after method operation 501. At method operation 502, the mobile device connecting module 330 transmits a fourth communication to the second mobile device, the fourth communication including an acceptance of the request to establish the wireless peer-to-peer connection with the second mobile device.

Figure 6:
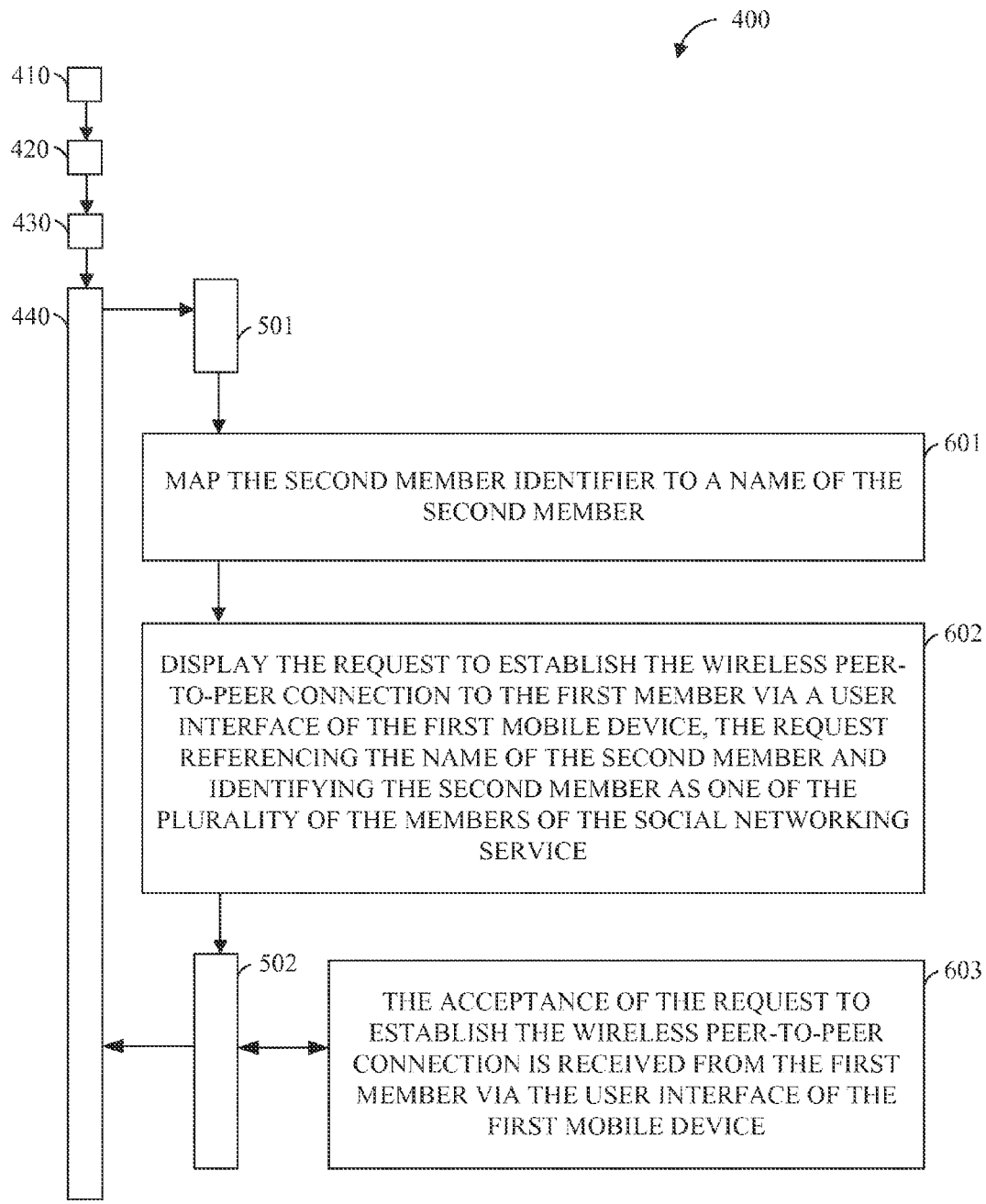
FIG. 6 is a flowchart that illustrates a method for facilitating the establishing of a wireless peer-to-peer network between mobile devices and represents the step 440 of the method illustrated in FIG. 4 in more detail, according to some example embodiments.

As shown in FIG. 6, the method 400 may include one or more of method operations 601, 602, and 603, according to some example embodiments. Method operation 601 may be performed after method operation 501, in which the mobile device connecting module 330 receives a third communication from the second mobile device, the third communication including a request to establish the wireless peer-to-peer connection with the second mobile device. At method operation 601, the social networking module 320 maps the second member identifier to a name of the second member.

Method operation 602 may be performed after method operation 601. At method operation 602, the display module 340 displays the request to establish the wireless peer-to-peer connection to the first member via a user interface of the first mobile device. The request to establish the wireless peer-to-peer connection may reference the name of the second member and may identify the second member as one of the plurality of the members of the social networking service. For example, the social networking module the user interface 320 may generate and the display module 340 may display the following message in the user interface of the first mobile device: "You have received a request to connect with the mobile device of user B. User B is a member of the Social Networking Service."

Method operation 603 may be performed after method operation 602 as part (e.g., a precursor task, a subroutine, or a portion) of method operation 502, in which the mobile device connecting module 330 transmits a fourth communication to the second mobile device, the fourth communication including an acceptance of the request to establish the wireless peer-to-peer connection with the second mobile device. At method operation 603, the acceptance of the request to establish the wireless peer-to-peer connection is received from the first member via the user interface of the first mobile device.

Figure 7:
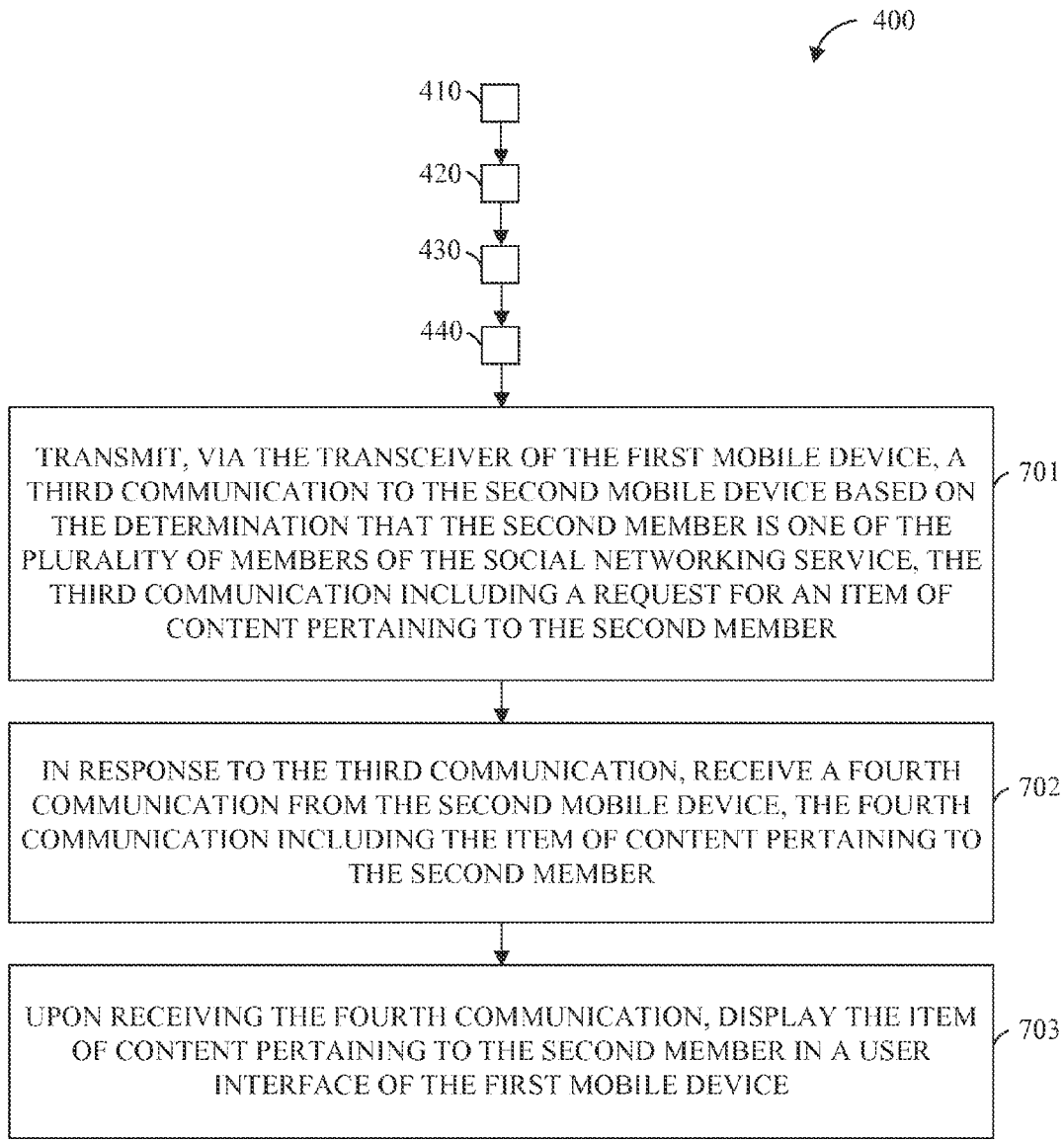
FIG. 7 is a flowchart that illustrates a method for facilitating the establishing of a wireless peer-to-peer network between mobile devices and represents additional steps of the method illustrated in FIG. 4, according to some example embodiments.

As shown in FIG. 7, the method 400 may include one or more of method operations 701, 702, and 703, according to some example embodiments. Method operation 701 may be performed after method operation 440, in which the mobile device connecting module 330, at the first mobile device, facilitates an establishing of the wireless peer-to-peer connection with the second mobile device based on the determining that that the second member is one of the plurality of members of the social networking service.

At method operation 701, the mobile device communication module 310 transmits, via the transceiver of the first mobile device, a third communication to the second mobile device based on the determination that the second member is one of the plurality of members of the social networking service. The third communication may include a request for an item of content pertaining to the second member.

Method operation 702 may be performed after method operation 701. At method operation 702, the mobile device communication module 310 receives a fourth communication from the second mobile device via the transceiver of the first mobile device. The fourth communication may be received in response to the third communication. The fourth communication may include the item of content pertaining to the second member. The item of content pertaining to the second member may be, for example, the name of the second member, the member profile of the second member, etc.

In some example embodiments, the second mobile device, in response to the request for the item of content pertaining to the second member selects an item of content pertaining to the second member. The selecting may include accessing a calendar of the second member, identifying a present context pertaining to the second member based on the calendar of the second member, identifying data relevant to the present context pertaining to the second member, and generating the item of content based on the data relevant to the present context pertaining to the second member.

In some example embodiments, the third communication to the second mobile device includes authentication data associated with the first member. The authentication data associated with the first member may be provided by the security module 350. The authentication data may authenticate the first member as another of the plurality of members of the social networking service. The request for the item of content pertaining to the second member may reference the authentication data associated with the first member.

In some example embodiments, the first member is associated with a first social graph that represents one or more connections of the first member with other members of the social networking service via the social networking service. The second member is associated with a second social graph that represents one or more connections of the second member with other members of the social networking service via the social networking service. A member of the social networking service may find it desirable to be able to communicate (or connect via the social networking service) with other member of the social networking service when the mobile device of the member discovers that other members of the social networking service are in a proximity to the member.

Figure 8:
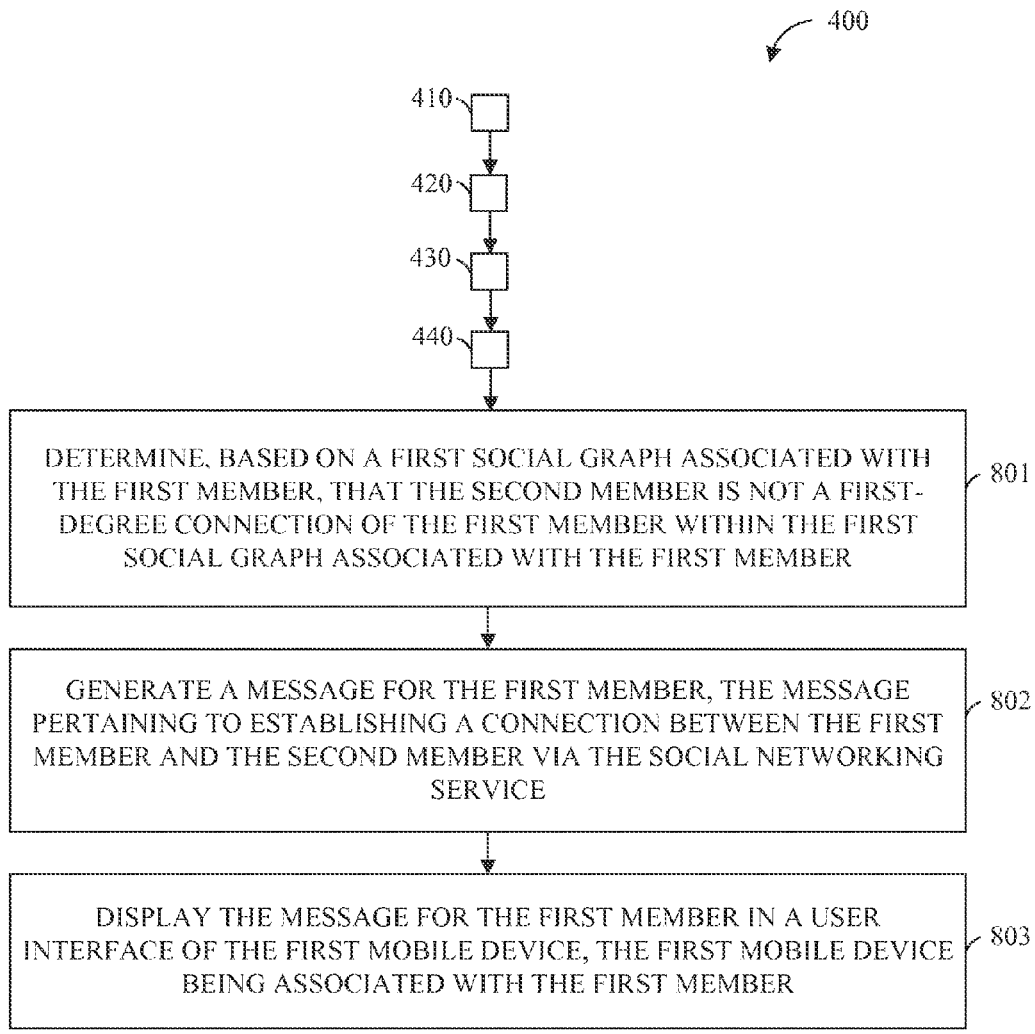
FIG. 8 is a flowchart that illustrates a method for facilitating the establishing of a wireless peer-to-peer network between mobile devices and represents additional steps of the method illustrated in FIG. 4, according to some example embodiments.

As shown in FIG. 8, the method 400 may include one or more of method operations 801, 802, and 803, according to some example embodiments. Method operation 801 may be performed after method operation 440, in which in which the mobile device connecting module 330, at the first mobile device, facilitates an establishing of the wireless peer-to-peer connection with the second mobile device based on the determining that that the second member is one of the plurality of members of the social networking service. At method operation 801, the social networking module 320 determines that the second member is not a first-degree connection of the first member within the first social graph associated with the first member. The determining that the second member is not a first-degree connection of the first member may be based on the first social graph associated with the first member.

Method operation 802 may be performed after method operation 801. At method operation 802, the member connecting module 360 generates a message for the first member. The message may pertain to establishing a connection between the first member and the second member via the social networking service.

Method operation 803 may be performed after method operation 802. At method operation 803, the display module 340 displays the message for the first member in a user interface of the first mobile device. The first mobile device may be associated with the first member.

Figure 9:
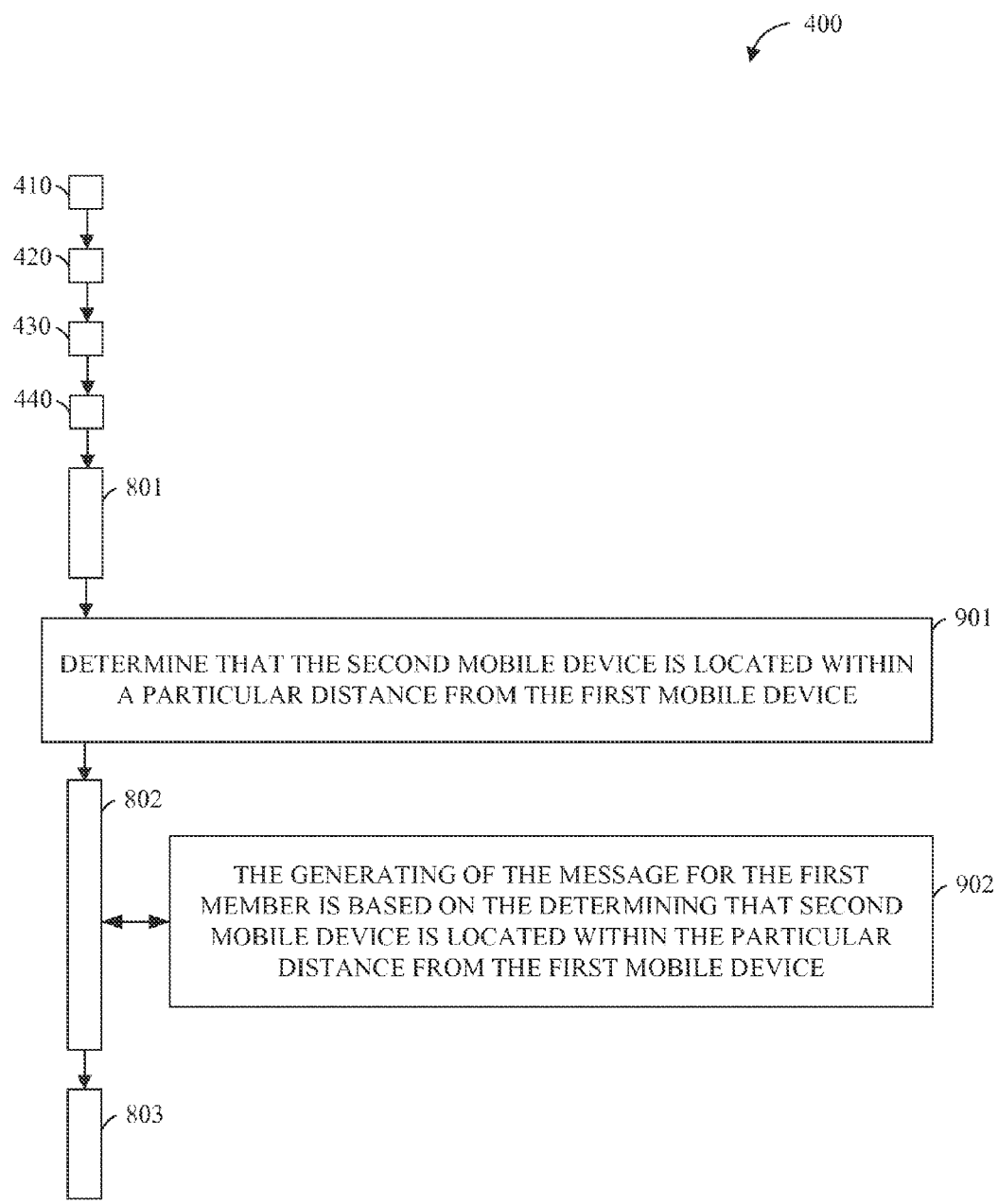
FIG. 9 is a flowchart that illustrates a method for facilitating the establishing of a wireless peer-to-peer network between mobile devices, represents an additional steps of the method illustrated in FIG. 8, and represents the step 802 of FIG. 8 in more detail, according to some example embodiments.

As shown in FIG. 9, the method 400 may include one or more of method operations 901 and 902, according to some example embodiments. Method operation 901 may be performed after method operation 801, in which the social networking module 320 determines that the second member is not a first-degree connection of the first member within the first social graph associated with the first member. At method operation 901, the proximity module 370 determines that the second mobile device is located within a particular distance from the first mobile device.

Method operation 902 may be performed as part (e.g., a precursor task, a subroutine, or a portion) of method operation 802, in which the social networking module 320 generates a message for the first member. At method operation 902, the social networking module 320 generates the message for the first member based on the determining that second mobile device is located within the particular distance from the first mobile device.

Figure 10:
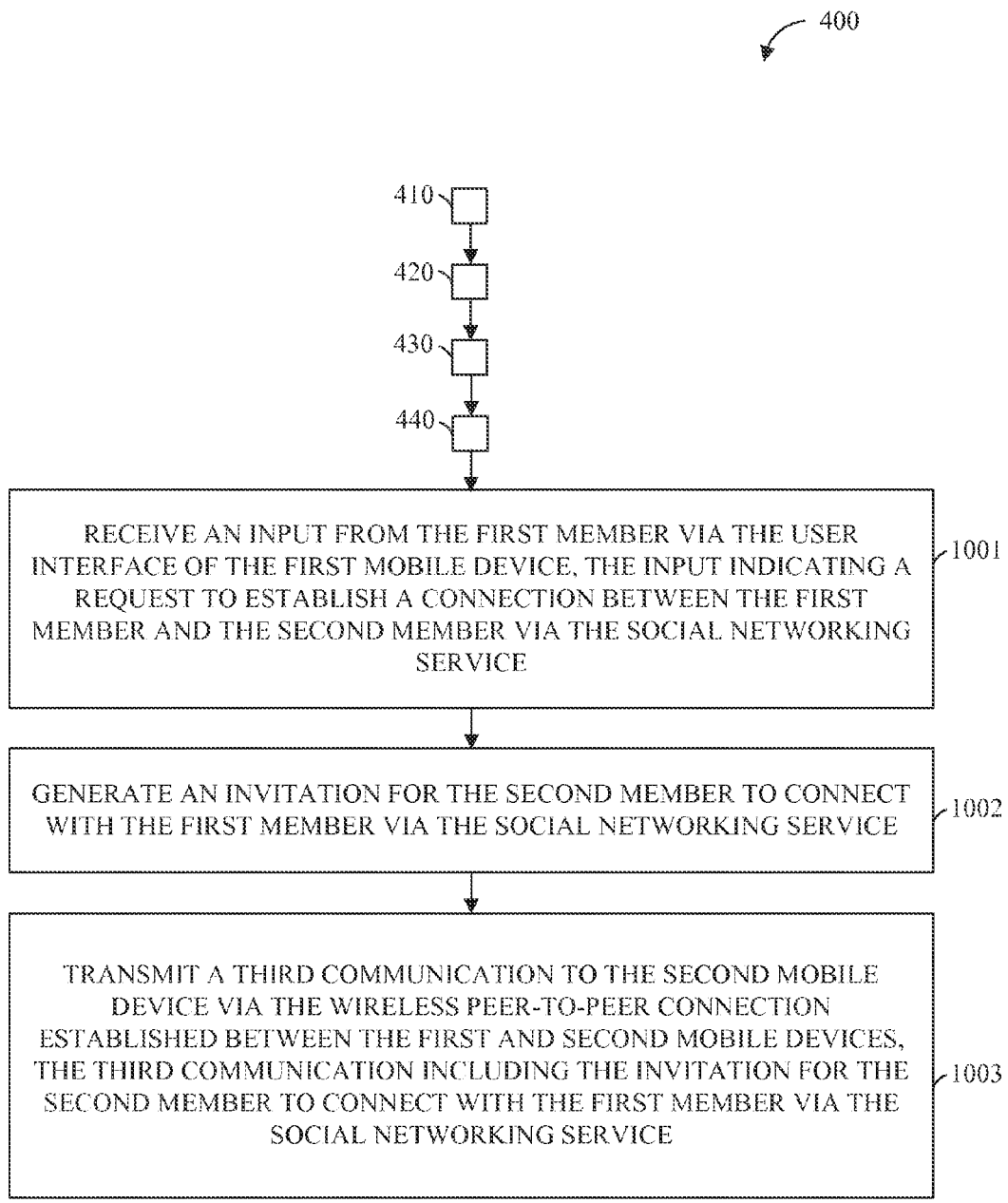
FIG. 10 is a flowchart that illustrates a method for facilitating the establishing of a wireless peer-to-peer network between mobile devices and represents additional steps of the method illustrated in FIG. 4, according to some example embodiments.

As shown in FIG. 10, the method 400 may include one or more of method operations 1001, 1002, and 1003, according to some example embodiments. Method operation 1001 may be performed after method operation 440, in which the mobile device connecting module 330, at the first mobile device, facilitates an establishing of the wireless peer-to-peer connection with the second mobile device based on the determining that that the second member is one of the plurality of members of the social networking service.

At method operation 1001, the display module 340 receives an input from the first member. In some instances, the input may be received via a user interface of the first mobile device. The input may be audio, visual, textual, tactile, etc. The input may indicate a request to establish the connection between the first member and the second member via the social networking service. In some example embodiments, the input may be received from the first user in response to the displaying of a prompt (e.g., a message) for the first member to connect with the second member via the social networking service.

Method operation 1002 may be performed after method operation 1001. At method operation 1002, the member connecting module 360, in response to receiving the input from the first member, generates an invitation for the second member to connect with the first member via the social networking service.

Method operation 1003 may be performed after method operation 1002. At method operation 1003, the mobile device communication module 310 transmits a third communication to the second mobile device via the wireless peer-to-peer connection established between the first and second mobile devices. The second mobile device may be associated with the second member. The third communication may include the invitation for the second member to connect with the first member via the social networking service.

Figure 11:
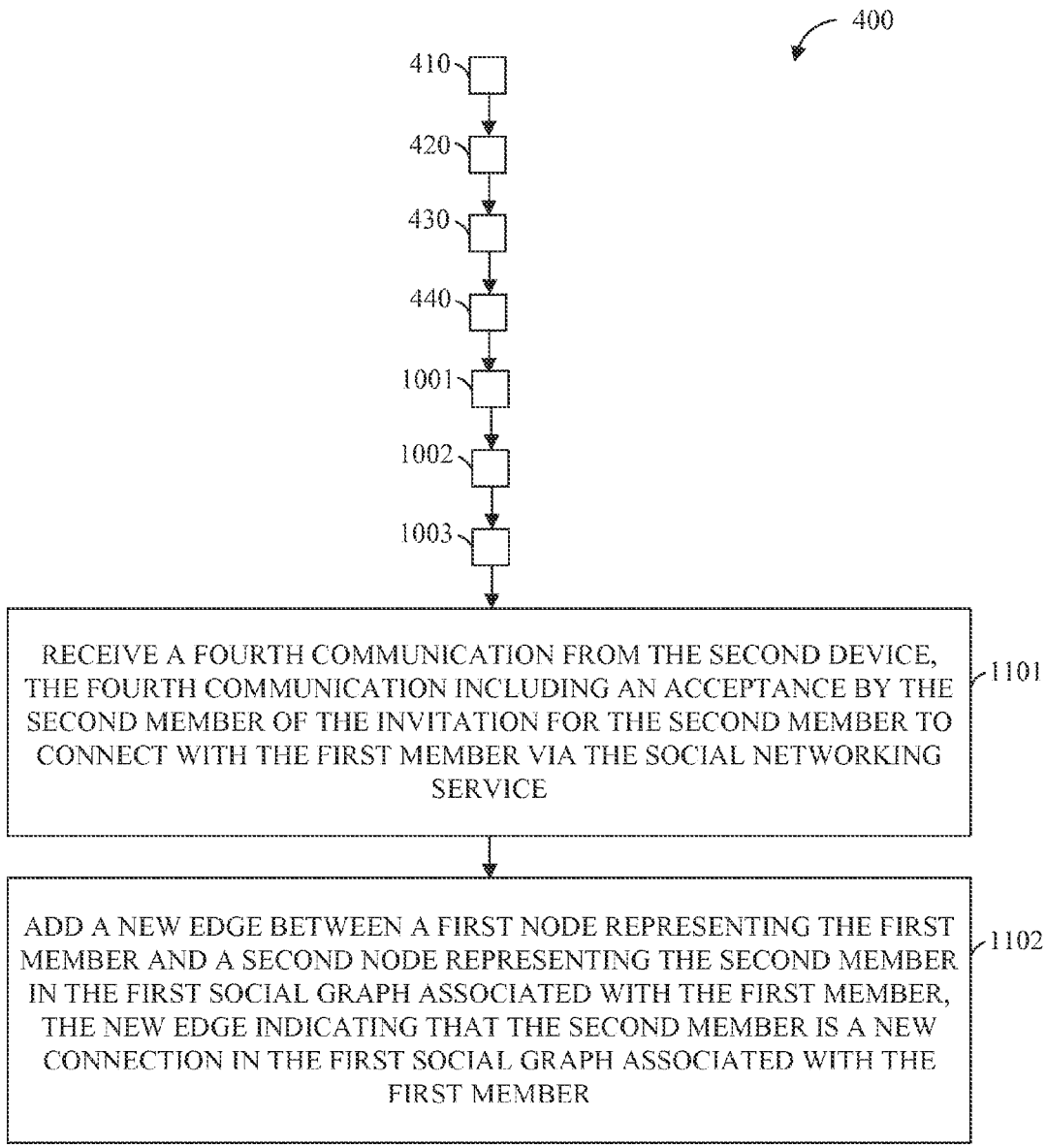
FIG. 11 is a flowchart that illustrates a method for facilitating the establishing of a wireless peer-to-peer network between mobile devices and represents additional steps of the method illustrated in FIG. 10, according to some example embodiments.

As shown in FIG. 11, the method 400 may include one or more of method operations 1101 and 1102, according to some example embodiments. Method operation 1101 may be performed after method operation 1003, in which the mobile device communication module 310 transmits a third communication to the second mobile device via the wireless peer-to-peer connection established between the first and second mobile devices. At method operation 1101, the mobile device communication module 310, in response to the third communication, receives a fourth communication from the second device. The fourth communication may include an acceptance by the second member of the invitation for the second member to connect with the first member via the social networking service.

Method operation 1102 may be performed after method operation 1101. At method operation 1102, the member connecting module 360 adds a new edge between a first node representing the first member in the first social graph associated with the first member and a second node representing the second member in the first social graph associated with the first member. The adding of the new edge in the first social graph associated with the first member may be based on the acceptance by the second member of the invitation to connect with the first member via the social networking service. The new edge may indicate that the second member is a new connection (of the first member) in the first social graph associated with the first member.

Similarly, at the second mobile device, one or more modules associated with the second mobile device may add another new edge between a third node representing the second member in the second social graph associated with the second member and a fourth node representing the first member in the second social graph associated with the second member. The adding of the other new edge in the second social graph associated with the second member may be based on the acceptance by the second member of the invitation to connect with the first member via the social networking service. The other new edge may indicate that the first member is a new connection (of the second member) in the second social graph associated with the second member.

Figure 12:
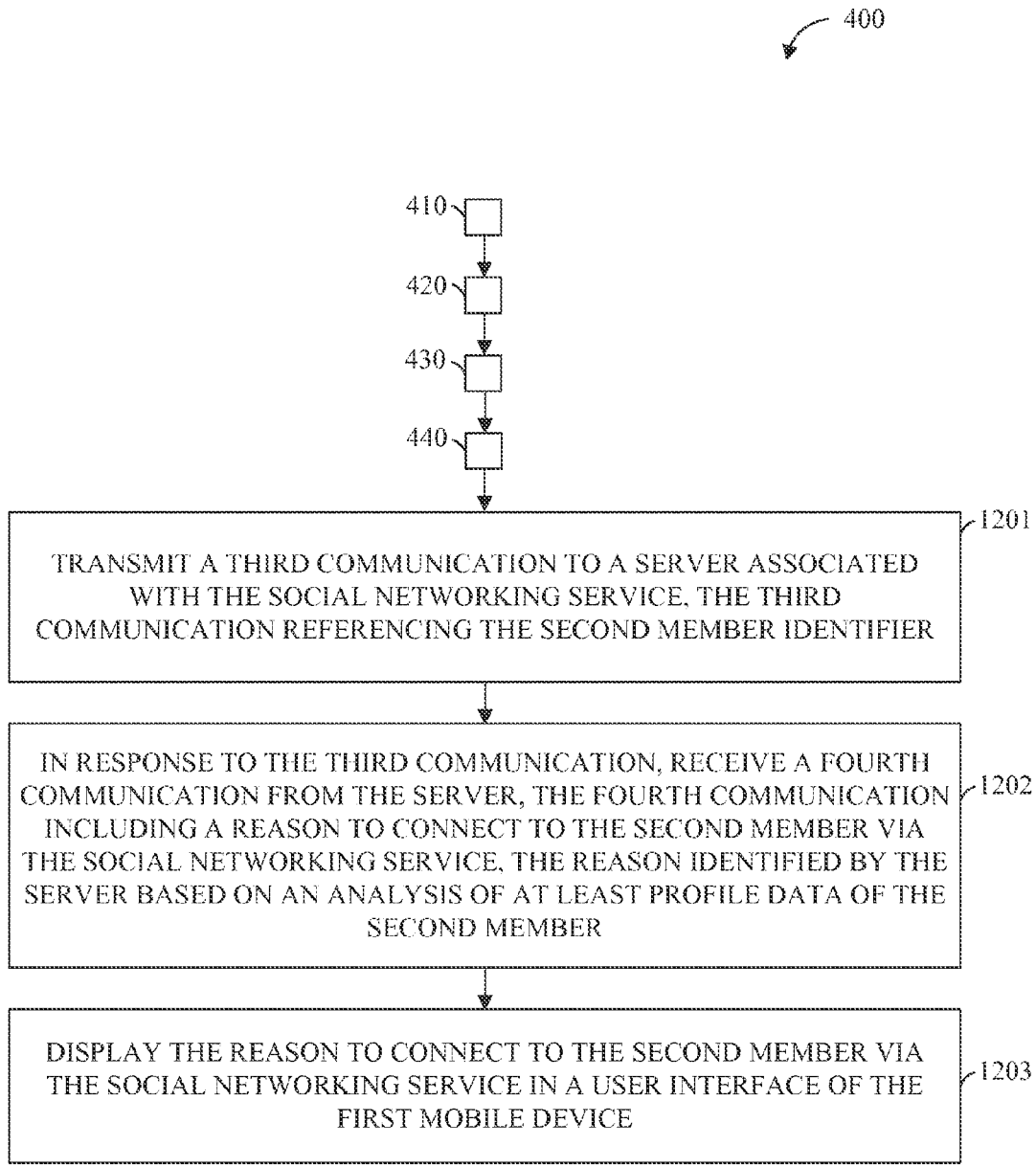
FIG. 12 is a flowchart that illustrates a method for facilitating the establishing of a wireless peer-to-peer network between mobile devices and represents additional steps of the method illustrated in FIG. 4, according to some example embodiments.

As shown in FIG. 12, the method 400 may include one or more of method operations 1201, 1202, and 1203, according to some example embodiments. Method operation 1201 may be performed after method operation 440, in which the in which the mobile device connecting module 330, at the first mobile device, facilitates an establishing of the wireless peer-to-peer connection with the second mobile device based on the determining that that the second member is one of the plurality of members of the social networking service.

At method operation 1201, the mobile device communication module 310 transmits a third communication to a server associated with the social networking service. The third communication may reference the second member identifier. The third communication may include a query (e.g., a request for information) pertaining to the second member.

Method operation 1202 may be performed after method operation 1201. At method operation 1202, the mobile device communication module 310, in response to the third communication, receives a fourth communication from the server. The fourth communication may include a reason to connect to the second member via the social networking service. The reason may be identified by the server based on an analysis of at least the profile data of the second member.

Method operation 1203 may be performed after method operation 1202. At method operation 1203, the display module 340 displays the reason to connect to the second member via the social networking service in a user interface of the first mobile device.

In some example embodiments, the mobile device communication module 310 transmits a third communication to a server associated with the social networking service. The third communication may include a request for information pertaining to the second member. In response to the third communication, the mobile device communication module 310 may receive a fourth communication including a member profile of the second member. The display module 340 may display the member profile of the second member in a user interface of the first mobile device.

Figure 13:
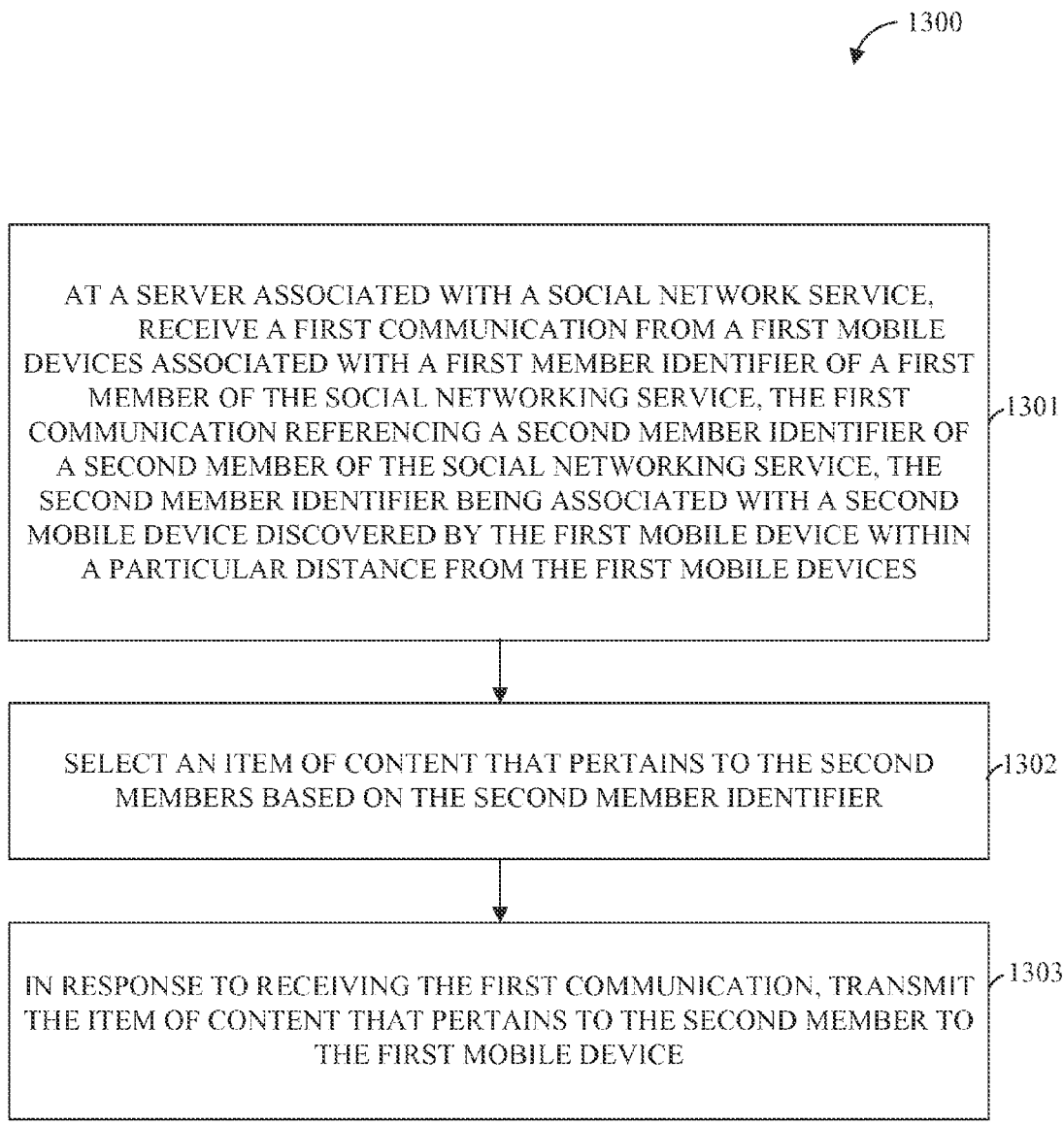
FIG. 13 is a flowchart that illustrates a method for selecting and providing, by a server associated with a social networking service, an item of content pertaining to a member of the social networking service to a mobile device, according to some example embodiments.

FIG. 13 is a flowchart that illustrates a method 1300 of selecting and providing, by a server associated with a social networking service (e.g., a server of the interaction support system 226), an item of content pertaining to a member of the social networking service to a mobile device, according to some example embodiments. Operations in the method 1300 may be performed using one or more modules associated with the server. As shown in FIG. 13, the method 1300 may include one or more of operations 1301, 1302, and 1303, according to some example embodiments.

At method operation 1301, the server receives a first communication from a first mobile devices associated with a first member identifier of a first member of the social networking service. The first communication may reference a second member identifier of a second member of the social networking service. The second member identifier may be associated with a second mobile device discovered by the first mobile device within a particular distance from the first mobile devices.

At method operation 1302, the server selects an item of content that pertains to the second members based on the second member identifier. At method operation 1303, the server, in response to receiving the first communication, transmits a second communication including the item of content that pertains to the second member to the first mobile device.

In some example embodiments, the selecting of the item of content that pertains to the second member includes accessing a calendar of the second member, identifying a present context pertaining to the second member based on the calendar of the second member, identifying data relevant to the present context pertaining to the second member, and generating an item of content based on the data relevant to the present context pertaining to the second member.

Example Mobile Device

Figure 14:
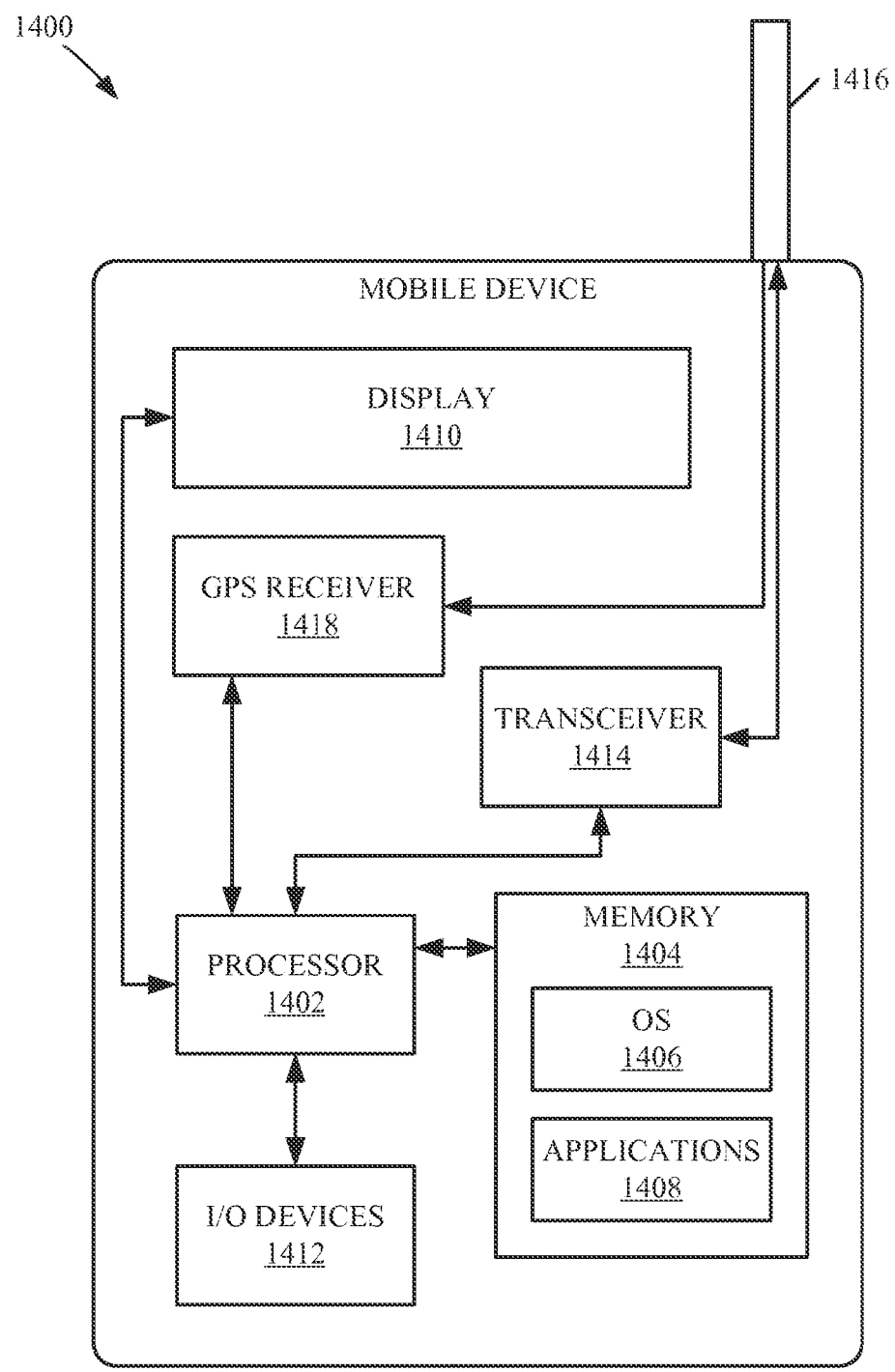
FIG. 14 is a diagram illustrating a mobile device, according to some example embodiments.

FIG. 14 is a block diagram illustrating a mobile device 1400, according to an example embodiment. The mobile device 1400 may include a processor 1402. The processor 1402 may be any of a variety of different types of commercially available processors 1402 suitable for mobile devices 1400 (for example, an XScale architecture microprocessor, a microprocessor without interlocked pipeline stages (MIPS) architecture processor, or another type of processor 1402). A memory 1404, such as a random access memory (RAM), a flash memory, or other type of memory, is typically accessible to the processor 1402. The memory 1404 may be adapted to store an operating system (OS) 1406, as well as application programs 1408, such as a mobile location enabled application that may provide LBSs to a user. The processor 1402 may be coupled, either directly or via appropriate intermediary hardware, to a display 1410 and to one or more input/output (I/O) devices 1412, such as a keypad, a touch panel sensor, a microphone, and the like. Similarly, in some embodiments, the processor 1402 may be coupled to a transceiver 1414 that interfaces with an antenna 1416. The transceiver 1414 may be configured to both transmit and receive cellular network signals, wireless data signals, or other types of signals via the antenna 1416, depending on the nature of the mobile device 1400. Further, in some configurations, a GPS receiver 1418 may also make use of the antenna 1416 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some example embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 15:
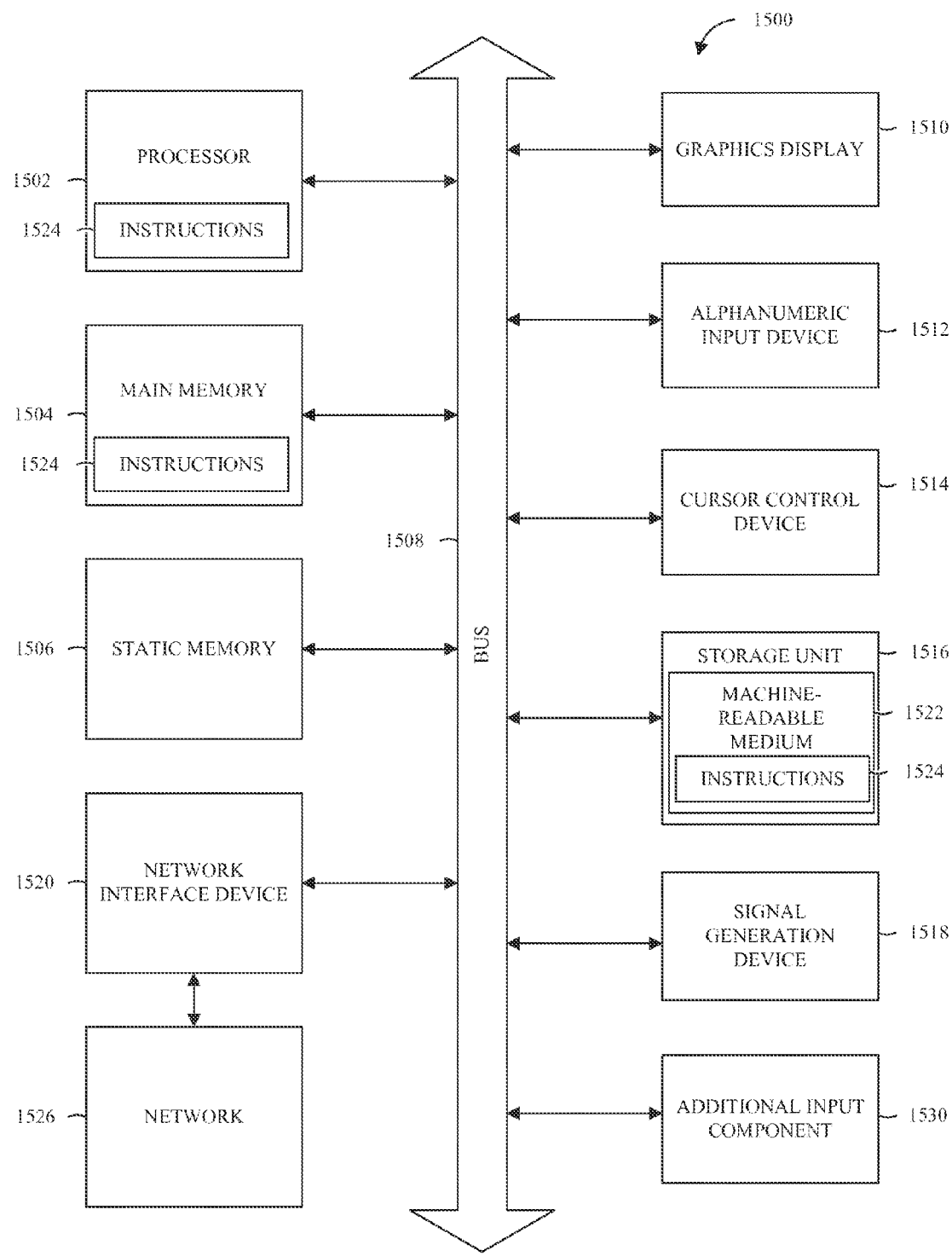
FIG. 15 is a block diagram illustrating components of a machine, according to some example embodiments, able to read instructions from a machine-readable medium and perform any one or more of the methodologies discussed herein.

FIG. 15 is a block diagram illustrating components of a machine 1500, according to some example embodiments, able to read instructions 1524 from a machine-readable medium 1522 (e.g., a non-transitory machine-readable medium, a machine-readable storage medium a computer-readable storage medium or any suitable combination thereof) and perform any one or more of the methodologies discussed herein, in whole or in part. Specifically, FIG. 15 shows the machine 1500 in the example form of a computer system (e.g., a computer) within which the instructions 1524 (e.g., software, a program, an application, an applet, an app, or other executable code) for causing the machine 1500 to perform any one or more of the methodologies discussed herein may be executed, in whole or in part.

In alternative embodiments, the machine 1500 operates as a standalone device or may be connected (e.g., networked) to other machines. In a networked deployment, the machine 1500 may operate in the capacity of a server machine or a client machine in a server-client network environment, or as a peer machine in a distributed (e.g., peer-to-peer) network environment. The machine 1500 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1524, sequentially or otherwise, that specify actions to be taken by that machine. Further, while only a single machine is illustrated, the term "machine" shall also be taken to include any collection of machines that individually or jointly execute the instructions 1524 to perform all or part of any one or more of the methodologies discussed herein.

The machine 1500 includes a processor 1502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1504, and a static memory 1506, which are configured to communicate with each other via a bus 1508. The processor 1502 may contain microcircuits that are configurable, temporarily or permanently, by some or all of the instructions 1524 such that the processor 1502 is configurable to perform any one or more of the methodologies described herein, in whole or in part. For example, a set of one or more microcircuits of the processor 1502 may be configurable to execute one or more modules (e.g., software modules) described herein.

The machine 1500 may further include a graphics display 1510 (e.g., a plasma display panel (PDP), a light emitting diode (LED) display, a liquid crystal display (LCD), a projector, a cathode ray tube (CRT), or any other display capable of displaying graphics or video). The machine 1500 may also include an alphanumeric input device 1512 (e.g., a keyboard or keypad), a cursor control device 1514 (e.g., a mouse, a touchpad, a trackball, a joystick, a motion sensor, an eye tracking device, or other pointing instrument), a storage unit 1516, an audio generation device 1518 (e.g., a sound card, an amplifier, a speaker, a headphone jack, or any suitable combination thereof), and a network interface device 1520.

The storage unit 1516 includes the machine-readable medium 1522 (e.g., a tangible and non-transitory machine-readable storage medium) on which are stored the instructions 1524 embodying any one or more of the methodologies or functions described herein. The instructions 1524 may also reside, completely or at least partially, within the main memory 1504, within the processor 1502 (e.g., within the processor's cache memory), or both, before or during execution thereof by the machine 1500. Accordingly, the main memory 1504 and the processor 1502 may be considered machine-readable media (e.g., tangible and non-transitory machine-readable media). The instructions 1524 may be transmitted or received over the network 1526 via the network interface device 1520. For example, the network interface device 1520 may communicate the instructions 1524 using any one or more transfer protocols (e.g., hypertext transfer protocol (HTTP)).

In some example embodiments, the machine 1500 may be a portable computing device, such as a smart phone or tablet computer, and have one or more additional input components 1530 (e.g., sensors or gauges). Examples of such input components 1530 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1522 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1524 for execution by the machine 1500, such that the instructions 1524, when executed by one or more processors of the machine 1500 (e.g., processor 1502), cause the machine 1500 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method, comprising:
   at a first mobile device associated with a first member identifier of a first member of a social networking service (SNS), receiving a first communication from a second mobile device via a transceiver of the first mobile device, the first communication including a second member identifier of a second member of the SNS, the second member identifier being associated with the second mobile device, the first communication being broadcast by the second mobile device and indicating that the second mobile device is available to establish one or more wireless peer-to-peer connections between the second mobile device and one or more other mobile devices;
   broadcasting, via the transceiver of the first mobile device, a second communication to the one or more other mobile devices including the second mobile device, the second communication including the first member identifier of the first member of the SNS, the second communication indicating that the first mobile device is available to establish one or more wireless peer-to-peer connections between the first mobile device and the one or more other mobile devices including the second mobile device;
   in response to the receiving of the first communication, determining, based on the second member identifier, that the second member is one of a plurality of members of the SNS;
   facilitating an establishing of a wireless peer-to-peer connection with the second mobile device based on the determining that that the second member is one of the plurality of members of the SNS; and
   displaying, in a user interface of the first mobile device, one or more member identifiers to indicate one or more established wireless peer-to-peer connections between the first mobile device and other mobile devices, the one or more established wireless peer-to-peer connections including the wireless peer-to-peer connection with the second mobile device, the displaying, of the second member identifier representing the wireless peer-to-peer connection with the second mobile device.

2. The method of claim 1, wherein the facilitating the establishing of the wireless peer-to-peer connection comprises:
   receiving a third communication from the second mobile device, the third communication including a request to establish the wireless peer-to-peer connection with the second mobile device, and transmitting a fourth communication to the second mobile device, the fourth communication including an acceptance of the request to establish the wireless peer-to-peer connection with the second mobile device.

3. The method of claim 2, further comprising:
   mapping the second member identifier to a name of the second member; and
   displaying the request to establish the wireless peer-to-peer connection to the first member via a user interface of the first mobile device, the request to establish the wireless peer-to-peer connection referencing the name of the second member and identifying the second member as one of the plurality of the members of the SNS, and wherein the acceptance of the request to establish the wireless peer-to-peer connection is received from the first member via the user interface of the first mobile device.

4. The method of claim 1, further comprising:
   transmitting, via the transceiver of the first mobile device, a third communication to the second mobile device based on the determination that the second member is one of the plurality of members of the SNS, the third communication including a request for an item of content pertaining to the second member;
   in response to the third communication, receiving a fourth communication from the second mobile device, the fourth communication including the item of content pertaining to the second member; and
   upon receiving the fourth communication, displaying the item of content pertaining to the second member in a user interface of the first mobile device.

5. The method of claim 4, Wherein the item of content pertaining to the second member is a member profile of the second member.

6. The method of claim 4, wherein the third communication to the second mobile device includes authentication data associated with the first member, the authentication data authenticating the first member as another of the plurality of members of the SNS, and wherein the request for the item of content pertaining to the second member references the authentication data associated with the first member.

7. The method of claim 1, wherein the first member is associated with a first social graph that represents one or more connections of the first member with other members of the SNS via the SNS, wherein the second member is associated with a second social graph that represents one or more connections of the second member with other members of the SNS via the SNS, and further comprising:
   determining, based on the first social graph associated with the first member, that the second member is not a first-degree connection of the first member within the first social graph associated with the first member;
   generating a message for the first member, the message pertaining to establishing a connection between the first member and the second member via the SNS; and
   displaying the message for the first member in a user interface of first mobile device, the first mobile device being associated with the first member.

8. The method of claim 7, further comprising:
   determining that the second mobile device is located within a particular distance from the first mobile device, and wherein the generating of the message for the first member is based on the determining that second mobile device is located within the particular distance from the first mobile device.

9. The method of claim 1, further comprising:
   receiving an input from the first member via a user interface of the first mobile device, the input indicating a request to establish the connection between the first member and the second member via the SNS;
   in response to receiving the input from the first member, generating an invitation for the second member to connect with the first member via the SNS: and transmitting a third communication to the second mobile device via the wireless peer-to-peer connection established between the first and second mobile devices, the second mobile device being associated with the second member, the third communication including the invitation for the second member to connect with the first member via the SNS.

10. The method of claim 9, further comprising:
in response to the third communication, receiving a fourth communication from the second device, the fourth communication including an acceptance by the second member of the invitation for the second member to connect with the first member via the SNS; and
based on the acceptance by the second member of the invitation, adding a new edge between a first node representing the first member and a second node representing the second member in the first social graph associated with the first member, the new edge indicating that the second member is a new connection in the first social graph associated with the first member.

11. The method of claim 1, further comprising:
transmitting a third communication to a server associated with the SNS, the third communication referencing the second member identifier;
in response to the third communication, receiving a fourth communication from the server, the fourth communication including a reason to connect to the second member via the SNS, the reason identified by the server based on an analysis of at least profile data of the second member; and
displaying the reason to connect to the second member via the SNS in a user interface of the first mobile device.

12. The method of claim 11, wherein the third communication transmitted to the server includes a request for information pertaining to the second member.

13. The method of claim 1, further comprising:
transmitting a third communication to a server associated with the SNS, the third communication including a request for information pertaining to the second member;
in response to the third communication, receiving a fourth communication including a member profile of the second member; and
displaying the member profile of the second member in a user interface of the first mobile device.

14. The method of claim 1, further comprising:
receiving a third communication from a third mobile device via the transceiver of the first mobile device, the third communication including a third member identifier of a third member of the SNS, the third member identifier being associated with the third mobile device, the third communication being broadcast by the third mobile device and indicating that the third mobile device is available to establish one or more wireless peer-to-peer connections between the third mobile device and one or more other mobile devices;
in response to the receiving of the third communication, determining, based on the third member identifier, that the third member is one of a plurality of members of the SNS; and
facilitating the third mobile device joining the wireless peer-to-peer connection established between the first and second mobile devices based on the determining that that the third member is one of the plurality of members of the SNS.

15. The method of claim 14, further comprising:
displaying a number of member identifiers including the second member identifier and the third member identifier in a user interface of the first mobile device, the second member identifier and the third member identifier identifying the second mobile device and the third mobile device as being wirelessly connected to the first mobile device via one or more wireless peer-to-peer connections;
determining that the second mobile device has interrupted the wireless peer-to-peer connection with the first mobile device; and
updating the number of member identifiers displayed in the user interface of the first mobile device based on the determining that the second mobile device has interrupted the wireless peer-to-peer connection with the first mobile device.

16. The method of claim 1, further comprising:
determining, based on the second member identifier, that the second member is not a first-degree connection of the first member within the social graph associated with the first member;
determining that a third member identifier associated with a third member of the SNS and referenced in a third communication received from a third mobile device is a first-degree connection of the first member within the social graph associated with the first member;
indicating, in the user interface of the first mobile device, that the second member of the SNS is not a first-degree connection within the social graph associated with the first member; and
indicating, in the user interface of the first mobile device, that the third member of the SNS is a first-degree connection within the social graph associated with the first member.

17. A non-transitory machine-readable medium comprising instructions that, when executed by one or more processors of a machine, cause the machine to perform operations comprising:
at a first mobile device associated with a first member identifier of a first member of a social networking service (SNS), receiving a first communication from a second mobile device via a transceiver of the first mobile device, the first communication including a second member identifier of a second member of the SNS, the second member identifier being associated with the second mobile device, the first communication being broadcast by the second mobile device and indicating that the second mobile device is available to establish one or more wireless peer-to-peer connections between the second mobile device and one or more other mobile devices;
broadcasting, via the transceiver of the first mobile device a second communication to the one or more other mobile devices including the second mobile device, the second communication including the first member identifier of the first member of the SNS, the second communication indicating that the first mobile device is available to establish one or more wireless peer-to-peer connections between the first mobile device and the one or more other mobile devices including the second mobile device;
in response to the receiving of the first communication, determining, based on the second member identifier, that the second member is one of a plurality of members of the SNS;

facilitating an establishing of a wireless peer-to-peer connection with the second mobile device based on the determining that that the second member is one of the plurality of members of the SNS; and displaying, in a user interface of the first mobile device, one or more member identifiers to indicate one or more established wireless peer-to-peer connections between the first mobile device and other mobile devices, the one or more established wireless peer-to-peer connections including the wireless peer-to-peer connection with the second mobile device, the displaying of the second member identifier representing the wireless peer- to-peer connection with the second mobile device.

* * * * *

UNITED STATES PATENT AND TRADEMARK OFFICE
CERTIFICATE OF CORRECTION

PATENT NO. : 9,572,000 B2  
APPLICATION NO. : 14/530356  
DATED : February 14, 2017  
INVENTOR(S) : Akhilesh Gupta Page 1 of 1

It is certified that error appears in the above-identified patent and that said Letters Patent is hereby corrected as shown below:

On the Title Page

In item (57), in "Abstract", in Column 2, Line 14, delete "that that the" and insert --that the-- therefor In the Claims In Column 29, Line 43, in Claim 1, after "determining", delete "that"

In Column 29, Line 51, in Claim 1, delete "displaying," and insert --displaying-- therefor In Column 30, Line 26, in Claim 5, delete "Wherein" and insert --wherein-- therefor In Column 30, Line 51, in Claim 7, after "interface of", insert --the--

In Column 30, Line 67, in Claim 9, delete "SNS:" and insert --SNS;-- therefor

In Column 32, Line 54, in Claim 17, delete "device" and insert --device,--, therefor In Column 33, Line 3, in Claim 17, after "determining", delete "that"

Signed and Sealed this  
Twenty-fourth Day of July, 2018

Andrei Iancu  
*Director of the United States Patent and Trademark Office*